United States Patent
Wu et al.

(10) Patent No.: US 12,328,698 B2
(45) Date of Patent: Jun. 10, 2025

(54) RECONFIGURABLE INTELLIGENT SURFACE ASSISTED SIDELINK RANGING

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Sourjya Dutta, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/409,739

(22) Filed: Aug. 23, 2021

(65) Prior Publication Data

US 2023/0057620 A1    Feb. 23, 2023

(51) Int. Cl.
*H04W 56/00* (2009.01)
*H04L 5/00* (2006.01)
*H04L 43/0864* (2022.01)
*H04W 76/14* (2018.01)

(52) U.S. Cl.
CPC ......... *H04W 56/004* (2013.01); *H04L 5/0048* (2013.01); *H04L 43/0864* (2013.01); *H04W 76/14* (2018.02)

(58) Field of Classification Search
CPC .. H04W 56/004; H04W 76/14; H04L 5/0048; H04L 43/0864; G01S 7/00; G01S 13/74
See application file for complete search history.

(56) References Cited

U.S. PATENT DOCUMENTS

| | | | | |
|---|---|---|---|---|
| 2017/0331577 A1* | 11/2017 | Parkvall | ............... | H04J 11/0079 |
| 2023/0176174 A1* | 6/2023 | Penna | ................ | G01S 5/02521 |
| | | | | 342/451 |
| 2023/0327714 A1* | 10/2023 | Baligh | ................ | H04B 7/0413 |
| | | | | 375/262 |

FOREIGN PATENT DOCUMENTS

| | | | | |
|---|---|---|---|---|
| EP | 3280200 A1 * | 2/2018 | ............ | H04W 56/00 |
| EP | 3996454 A1 * | 5/2022 | ........... | H04L 5/0064 |
| WO | WO-2020082017 A1 * | 4/2020 | ........... | G01S 13/825 |

(Continued)

OTHER PUBLICATIONS

Wymeersch et al., Radio Localization and Mapping with Reconfigurable Intelligent Surfaces, Jun. 11, 2020 (Year: 2020).*

(Continued)

*Primary Examiner* — Peter Chen
*Assistant Examiner* — Jia Hao Deng
(74) *Attorney, Agent, or Firm* — Procopio, Cory, Hargreaves & Savitch LLP

(57) ABSTRACT

Aspects presented herein may enable one or more wireless devices to perform a sidelink-based ranging and/or positioning with an assistance of an RIS. In one aspect, a first wireless device receives an information indicating at least a time in which at least one RIS is to be activated. The first wireless device transmits a first set of reference signals to a second wireless device via the at least one RIS. The first wireless device receives a second set of reference signals transmitted from the second wireless device via the at least one RIS. The first wireless device calculates a first signal RTT based on the first set of reference signals and the second set of reference signals.

24 Claims, 18 Drawing Sheets

(56) References Cited

FOREIGN PATENT DOCUMENTS

WO    WO-2020145727 A1 * 7/2020 ........... H04L 5/0051

OTHER PUBLICATIONS

International Search Report and Written Opinion—PCT/US2022/037911—ISA/EPO—Oct. 21, 2022.
Mizmizi M., et al.,"6G V2X Technologies and Orchestrated Sensing for Autonomous Driving", arxiv.org, Cornell University Library, 201 Olin Library Cornell University Ithaca, NY 14853, May 22, 2021, 9 Pages, XP081973016, abstract, figures 1, 4 section I section IV sections V.A and V.B.
Wymeersch H., et al., "Radio Localization and Mapping with Reconfigurable Intelligent Surfaces", arxiv.org, 201 Olin Library Cornell University, Ithaca, NY, 14853, Dec. 19, 2019, XP081569725, pp. 1-7, Figure 1, Abstract, Right-Hand Column, Lines 29-31, Figure 3, pp. 5,6, p. 2, left-hand column, line 2-8 p. 3, left-hand column, line 2-4 p. 4, right-hand column, lines 6, 7, 11, 12, 36, 37 p. 5, left-hand column, line 15-17, pp. 5,6.

* cited by examiner

RECONFIGURABLE INTELLIGENT SURFACE ASSISTED SIDELINK RANGING

TECHNICAL FIELD

The present disclosure relates generally to communication systems, and more particularly, to wireless communication involving sidelink ranging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives an information indicating at least a time in which at least one reconfigurable intelligent surface (RIS) is to be activated. The apparatus transmits a first set of reference signals to a second wireless device via the at least one RIS. The apparatus receives a second set of reference signals transmitted from the second wireless device via the at least one RIS. The apparatus calculates a first signal round-trip time (RTT) based on the first set of reference signals and the second set of reference signals.

In an aspect of the disclosure, a method, a computer-readable medium, and an apparatus are provided. The apparatus transmits an information indicating at least a time in which at least one RIS is to be activated. The apparatus activates the at least one RIS based on the transmitted information, a request, or an indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
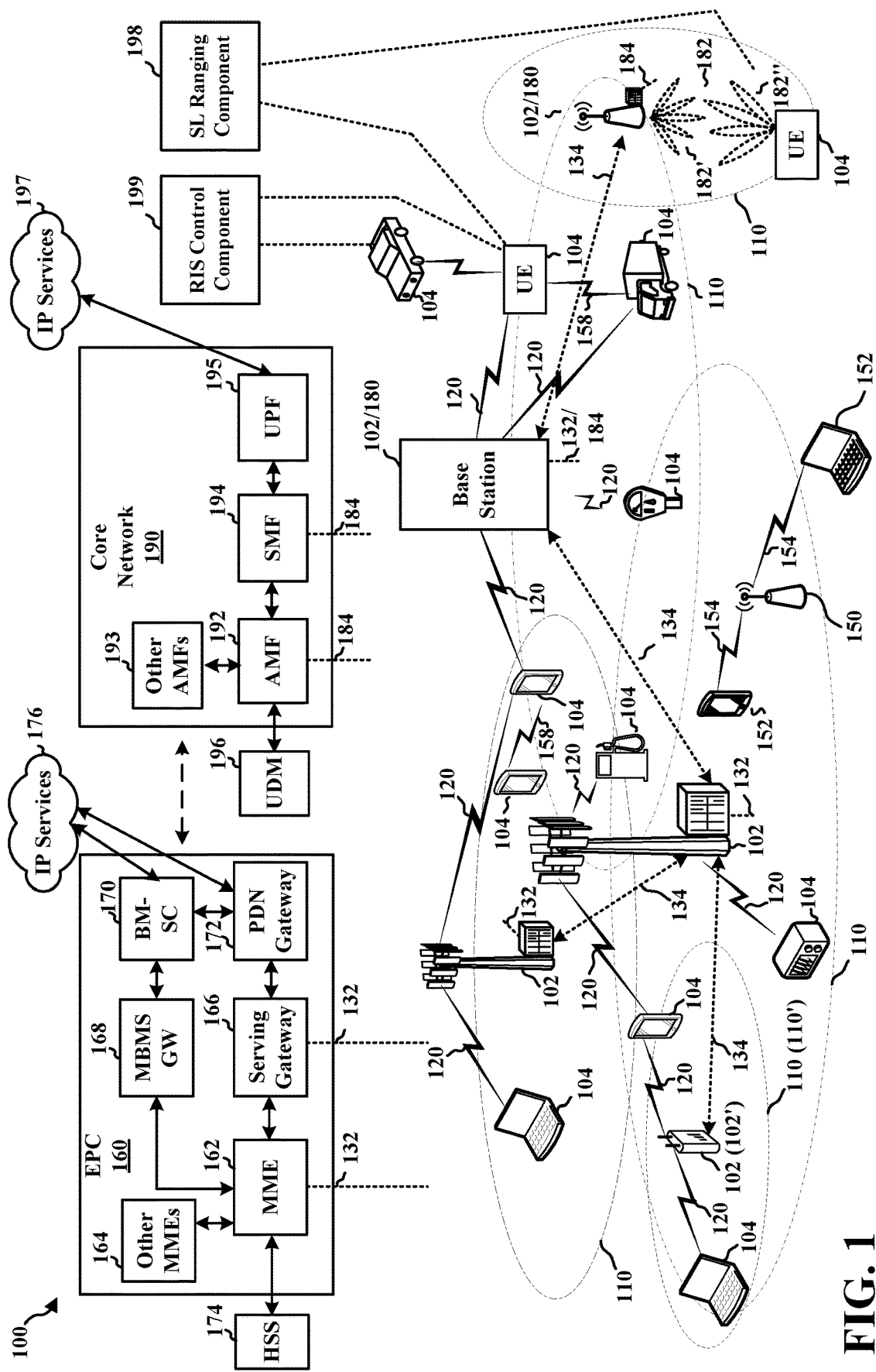
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Aspects presented herein may improve the efficiency and performance of an SL-based ranging or positioning. Aspects presented herein may improve the accuracy of an SL ranging that is based on calculating the RTT of transmitted/received PRSs. In one aspect of the represent disclosure, at least one RIS may be utilized by one or more wireless devices for relaying reference signals (e.g., SL PRSs) to improve the accuracy of an SL-based ranging or positioning. For example, as an NLOS path/channel may increase the RTT between PRSs transmitted to and/or PRSs received from a wireless device, or the NLOS path/channel may affect or block transmissions of the PRSs between wireless devices, an RIS may enable the PRSs to be transmitted and/or received by one or more wireless devices in a path/channel that is closer or similar to an LOS path/channel. As presented herein, a UE may receive information indicating a time in which an RIS is to be activated. The UE may transmit a first set of reference signals to a second wireless device via the at least one RIS and may receive a second set of reference signals transmitted from the second wireless device via the at least one RIS. The UE may calculate a first signal RTT based on the first set of reference signals and the second set of reference signals.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include an SL ranging component 198 configured to perform an SL ranging with another UE with an assistance of an RIS. In one configuration, the SL ranging component 198 may be configured to receive an information indicating at least a time in which at least one MS is to be activated. In such configuration, the SL ranging component 198 may transmit a first set of reference signals to a second wireless device via the at least one MS. In such configuration, the SL ranging component 198 may receive a second set of reference signals transmitted from the second wireless device via the at least one RIS. In such configuration, the SL ranging component 198 may calculate a first signal RTT based on the first set of reference signals and the second set of reference signals.

In certain aspects, the UE 104 (or an RSU) may include an RIS control component 199 configured to control at least one RIS that may be associated or co-located with the UE 104. In one configuration, the RIS control component 199 may be configured to transmit an information indicating at least a time in which at least one RIS is to be activated. In such configuration, the RIS control component 199 may activate the at least one RIS based on the transmitted information, a request, or an indication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
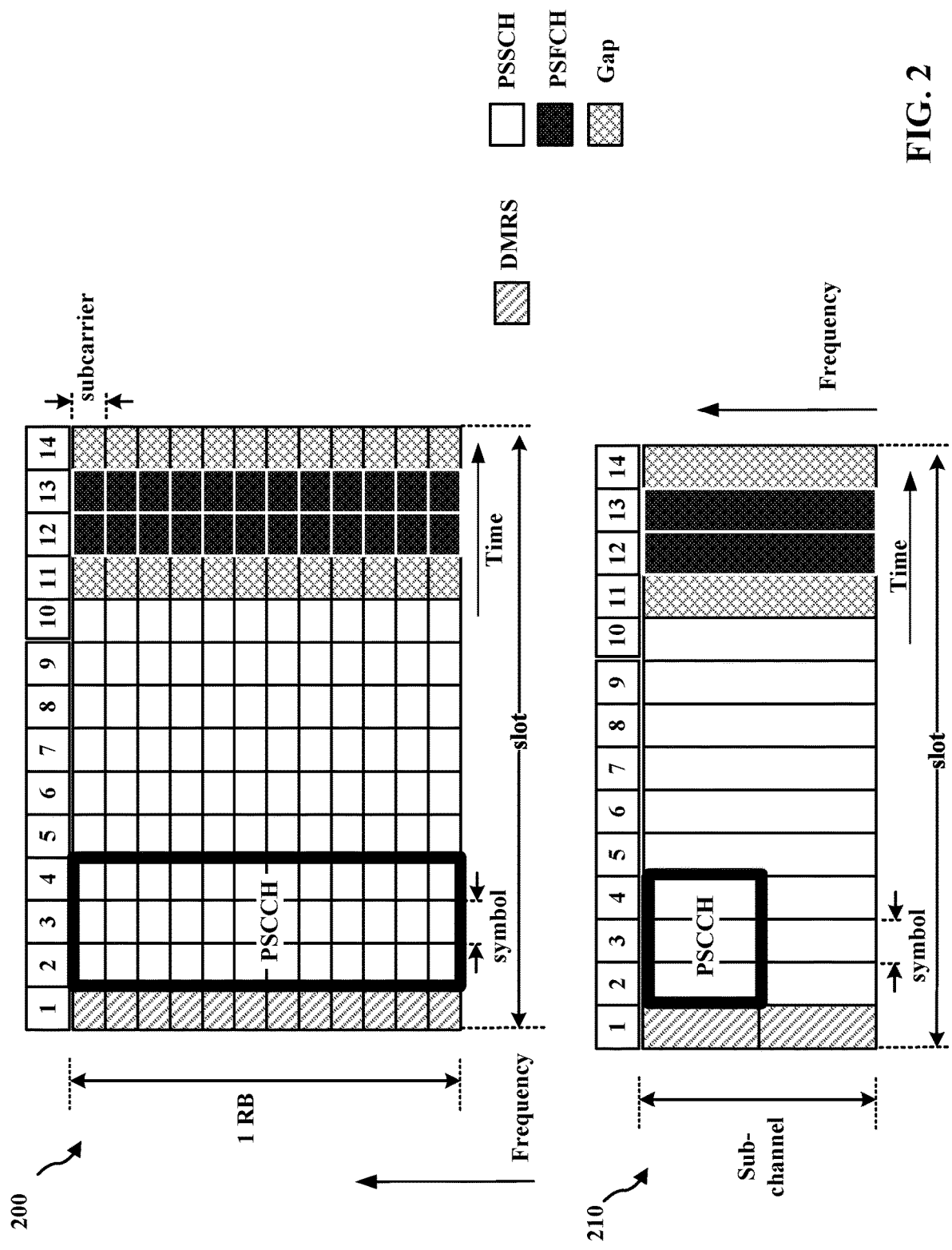
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
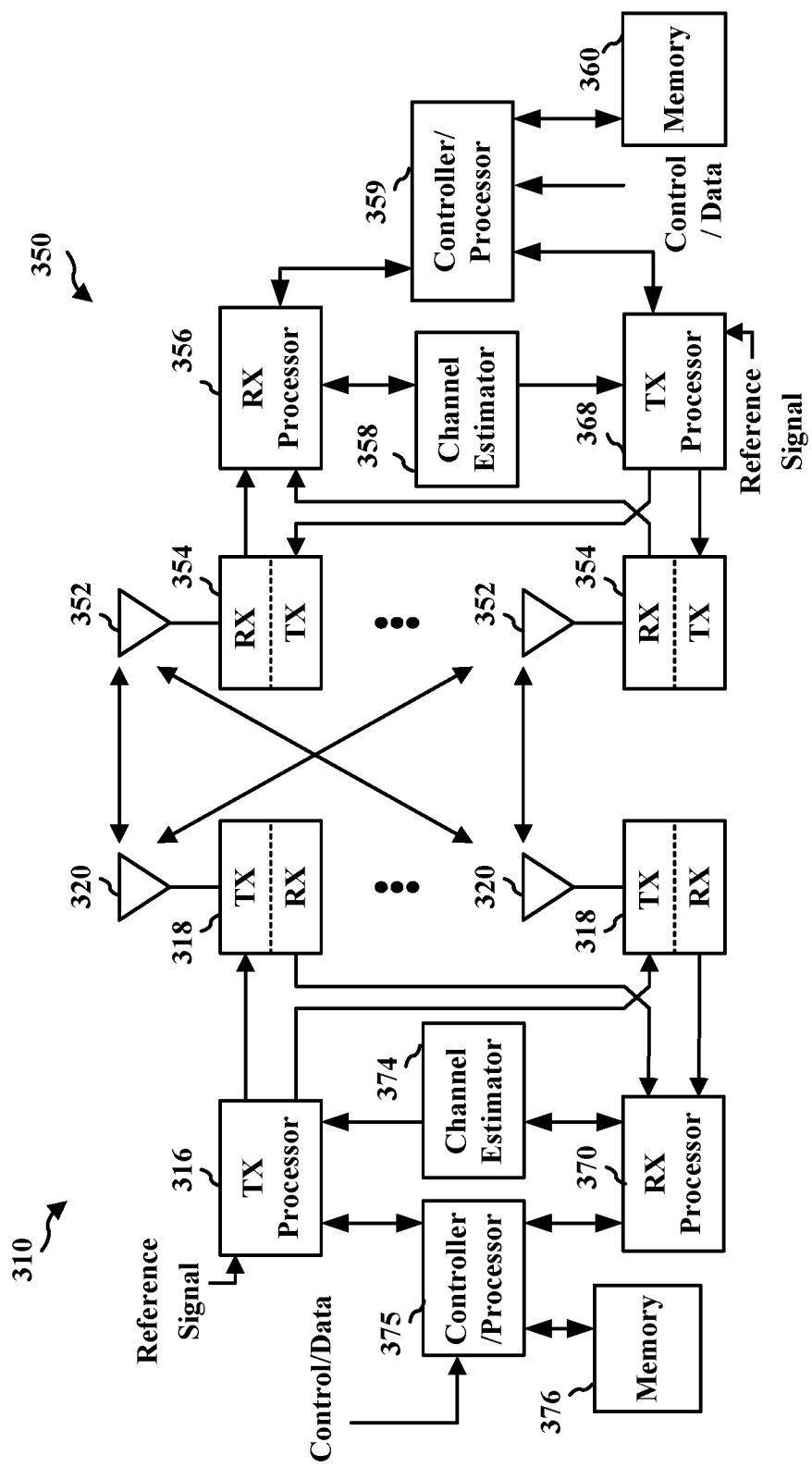
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the SL ranging component 198 of FIG. 1. In another example, at least one of the TX processor 368, the RX processor 356, and the controller/processor 359 may be configured to perform aspects in connection with the RIS control component 199 of FIG. 1.

Figure 4:
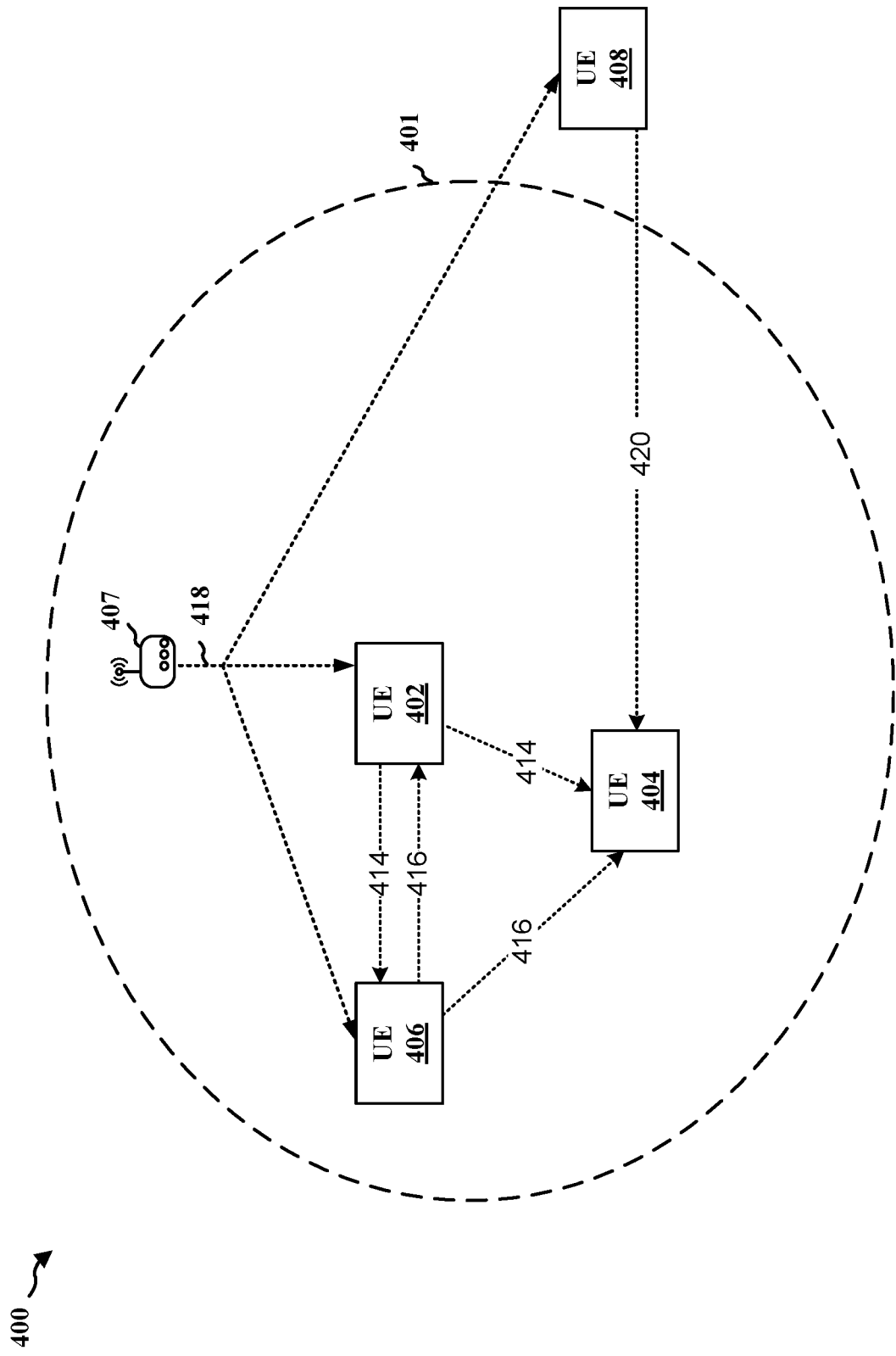
FIG. 4 is a diagram illustrating an example of wireless communication between devices based on sidelink communication in accordance with various aspects of the present disclosure.

FIG. 4 is a diagram 400 illustrating an example of wireless communication between devices based on sidelink communication. In one example, a UE 402 may transmit a transmission 414, e.g., including a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1" or "sidelink Mode 1"), centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180. In a second resource allocation mode (which may be referred to herein as "Mode 2" or "sidelink Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

A UE's position and/or a UE's range with respect to another UE may be determined/estimated based on sidelink (SL) communications. For example, two UEs may determine their locations (e.g., absolute locations) based on global navigation satellite system (GNSS), and the UEs may exchange their locations (e.g., their geographical longitude and latitude) with each other, such as via a V2X safety message. Thus, a UE may obtain, or otherwise determine, its location based on the GNSS and may broadcast, or otherwise transmit, information about its location in a sidelink message. As such, each of the surrounding UEs may be able to determine the location of the UE transmitting its location, and/or may determine a range between itself and the UE transmitting its location. If each of the UEs in the area transmit their respective location information, a UE may determine distances to the surrounding UEs relative to its location. In another example, UEs may determine their relative distance to another UE(s) and/or their absolute positions (e.g., geographical locations) based on reference signals transmitted and received between the UEs over sidelink, where such ranging or positioning technique may be referred to as an SL-based ranging or positioning. The distance between UEs may be monitored for various reasons. In some applications, such as V2X, the distance between UEs may be monitored as a part of avoiding collisions, improving road user safety, etc. The SL-based ranging or positioning may provide a UE with an alternative or additional ranging/positioning mechanism when positioning based on GNSS is attenuated or unavailable (e.g., when the UE is in a tunnel, an urban area, a canyon, or a sheltered place, etc.). For example, the SL-based ranging or positioning may be used by UEs for public safety use cases when network service and/or other positioning services are not available. In other examples, if the GNSS is available, the SL-based ranging or positioning may further be used by a positioning device in addition to a GNSS-based positioning to enhance the accuracy of the GNSS-based positioning.

In one example, an SL-based ranging or positioning for a UE may be accomplished based on a three-way handshake for a session establishment between the UE and one or more peer UEs, followed by exchanging of PRSs between the UE and the one or more peer UEs, and concluded by exchanging measurements based on PRS transmission and reception via messaging between the UE and the one or more peer UEs.

Figure 5:
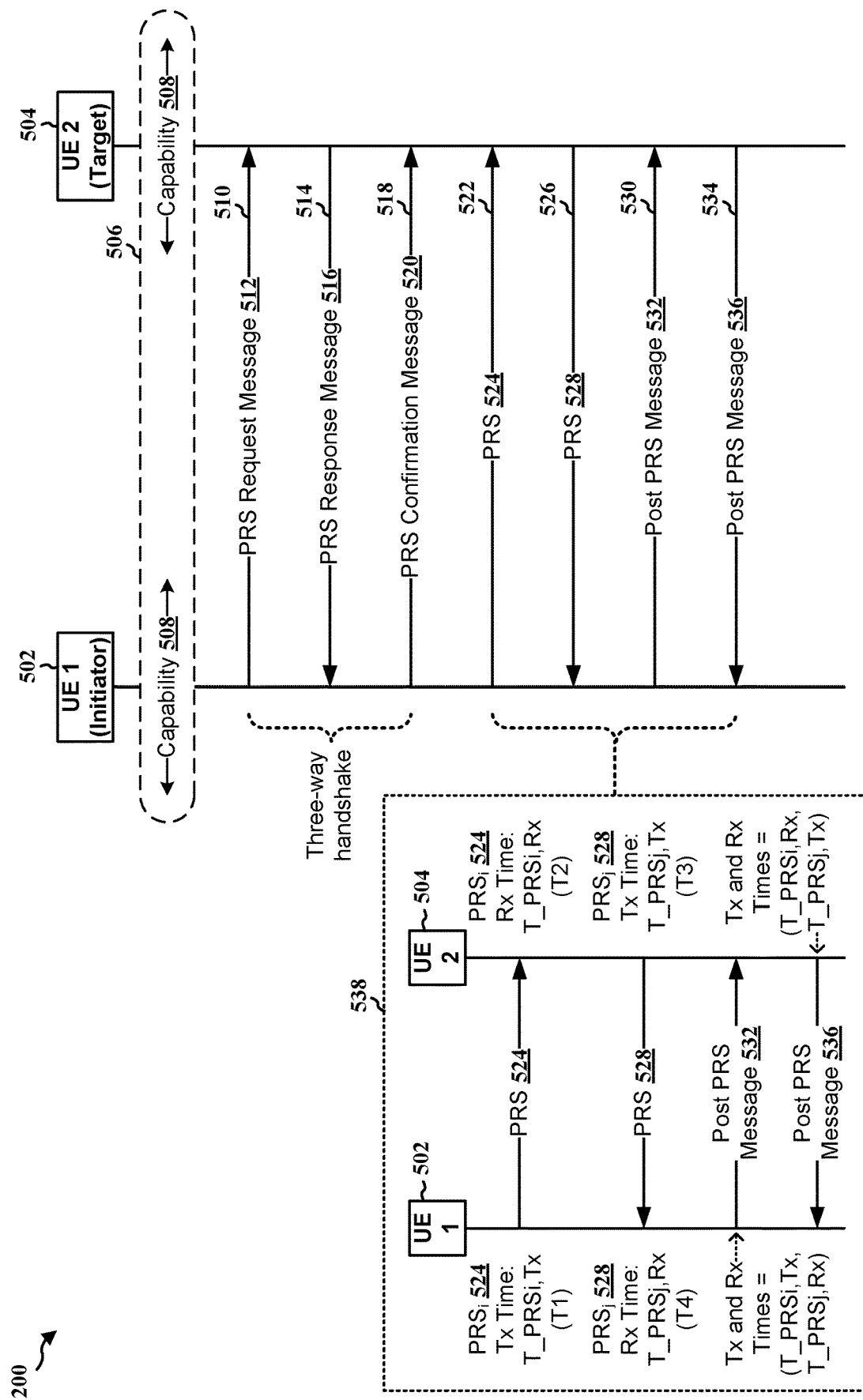
FIG. 5 is a communication flow illustrating an example of a sidelink (SL)-based ranging or positioning session between two UEs in accordance with various aspects of the present disclosure.

FIG. 5 is a communication flow 500 illustrating an example of an SL-based ranging or positioning session between two UEs in accordance with various aspects of the present disclosure. An SL ranging between a first UE 502 (e.g., an initiator) and a second UE 504 (e.g., a target) may be determined based at least in part on calculating an inter-UE round trip time (RTT) between positioning reference signals (PRSs) (e.g., wideband PRSs, SL PRSs, etc.) transmitted from the first UE 502 to the second UE 504 and the PRSs transmitted from the second UE 504 to the first UE 502. For example, based on the transmission (Tx) and reception (Rx) times of PRSs between the first UE 502 and the second UE 504, the first UE 502 and/or the second UE 504 may be able to determine the RTT between the transmitted PRSs and the received PRSs. Then, based on the RTT, the first UE 502 and/or the second UE 504 may determine a distance between the first UE 502 and the second UE 504.

In one example, as shown at 506, the first UE 502 and/or the second UE 504 may exchange a capability message 508 with each other, where the capability message 508 from the first UE 502 and/or the second UE 504 may include information related to each UE's capability to perform an SL-ranging/positioning. Based at least in part on the exchanged capability messages 508, the first UE 502 may determine whether the second UE 504 is a candidate for performing the SL-ranging/positioning.

After the capability message 508 exchanging, the first UE 502 may initiate an SL-ranging/positioning session with the second UE 504 by establishing a three (3)-way handshake with the second UE 504. For example, at 510, the first UE 502 may transmit a PRS request message 512 (e.g., PRS-request) to the second UE 504 for requesting the second UE 504 to transmit one or more PRSs to the first UE 502. At 514, in response to the PRS request message 512, the second UE 504 may transmit a PRS response message 516 to the first UE 502. For example, the PRS response message 516 may indicate whether the second UE 504 is able to grant the first UE 502's PRS request (e.g., the request for exchanging PRS). At 518, in response to the PRS response message 516, the first UE 502 may transmit a PRS confirmation message 520 to the second UE 504. For example, the PRS confirmation message 520 may confirm the PRS transmissions between the first UE 502 and the second UE 504. In other words, the three-way handshake initiated by the first UE 502 may include transmissions of the PRS request message 512, reception of the PRS response message 516, and transmission of the PRS confirmation message 520 at the first UE 502.

At 522, after the three-way handshake, the first UE 502 may transmit one or more PRSs 524 to the second UE 504. At 526, in response to the one or more PRSs 524, the second UE 504 may transmit one or more PRSs 528 to the first UE 502.

At 530, after receiving the one or more PRSs 526 from the second UE 504, the first UE 502 may measure the received one or more PRSs 526, such as the time in which the one or more PRSs 526 are received, and the first UE 502 may transmit information related to the measurement to the second UE 504 via a post PRS message 532. Similarly, at 534, the second UE 504 may measure the one or more PRSs 528, and the second UE 504 may transmit information related to the measurement to the first UE 502 via a post PRS message 536.

Based on a local measurement for the transmitted and the received PRSs (e.g., PRSs 524 and 528) and based on the measurement received from the other UE in the post PRS message (e.g., 532 or 536), the first UE 502 and/or the second UE 504 may be able to determine an RTT for the transmitted and the received PRSs.

In one example, as shown at 538, the first UE 502 and/or the second UE 504 may include two timestamps for the Tx time and the Rx time of the PRSs transmitted and received in its respective post PRS message. Then, the first UE 502 and/or the second UE 504 may determine the RTT for the PRSs transmitted and received based on the two timestamps received from the other UE. For example, the first UE 502 may include a transmission time for the one or more PRSs 524 (e.g., $T_{PRS_i,Tx}$, T1) and a reception time for the one or more PRSs 528 (e.g., $T_{PRS_j,Rx}$, T4) in the post PRS message 532, and the second UE 504 may include a reception time for the one or more PRSs 524 (e.g., $T_{PRS_i,Rx}$, T2) and a transmission time for the one or more PRSs 528 (e.g., $T_{PRS_j,Tx}$, T3) in the post PRS message 536. In other words, each UE may transmit its PRS Tx time and the Rx time for the PRS received from the peer UE in its post PRS message. Then, the RTT from the first UE 502 to the second UE 504 may be calculated by subtracting the respective Rx-Tx times of the PRSs for the first UE 502 and the second UE 504. For example, the RTT may be calculated based on the following equations:

$$RTT = (T_{PRS_i,Rx} - T_{PRS_i,Tx}) + (T_{PRS_j,Rx} - T_{PRS_j,Tx}),$$

$$RTT = \begin{pmatrix} PRS_i \text{ one way} \\ \text{time of flight} \end{pmatrix} + \begin{pmatrix} PRS_j \text{ one way} \\ \text{time of flight} \end{pmatrix}.$$

Then, a distance between the first UE 502 and the second UE 504 may be computed based on the calculated RTT. The SL-based ranging or positioning described herein may apply to two vehicle UEs (e.g., for calculating/estimating a distance between two vehicles), to a vehicle UE and a pedestrian UE (e.g., for calculating/estimating a distance a vehicle and a pedestrian), and/or to two mobile phones in general sidelink use cases (e.g., for calculating/estimating a distance between two mobile phone users), etc.

Figure 6:
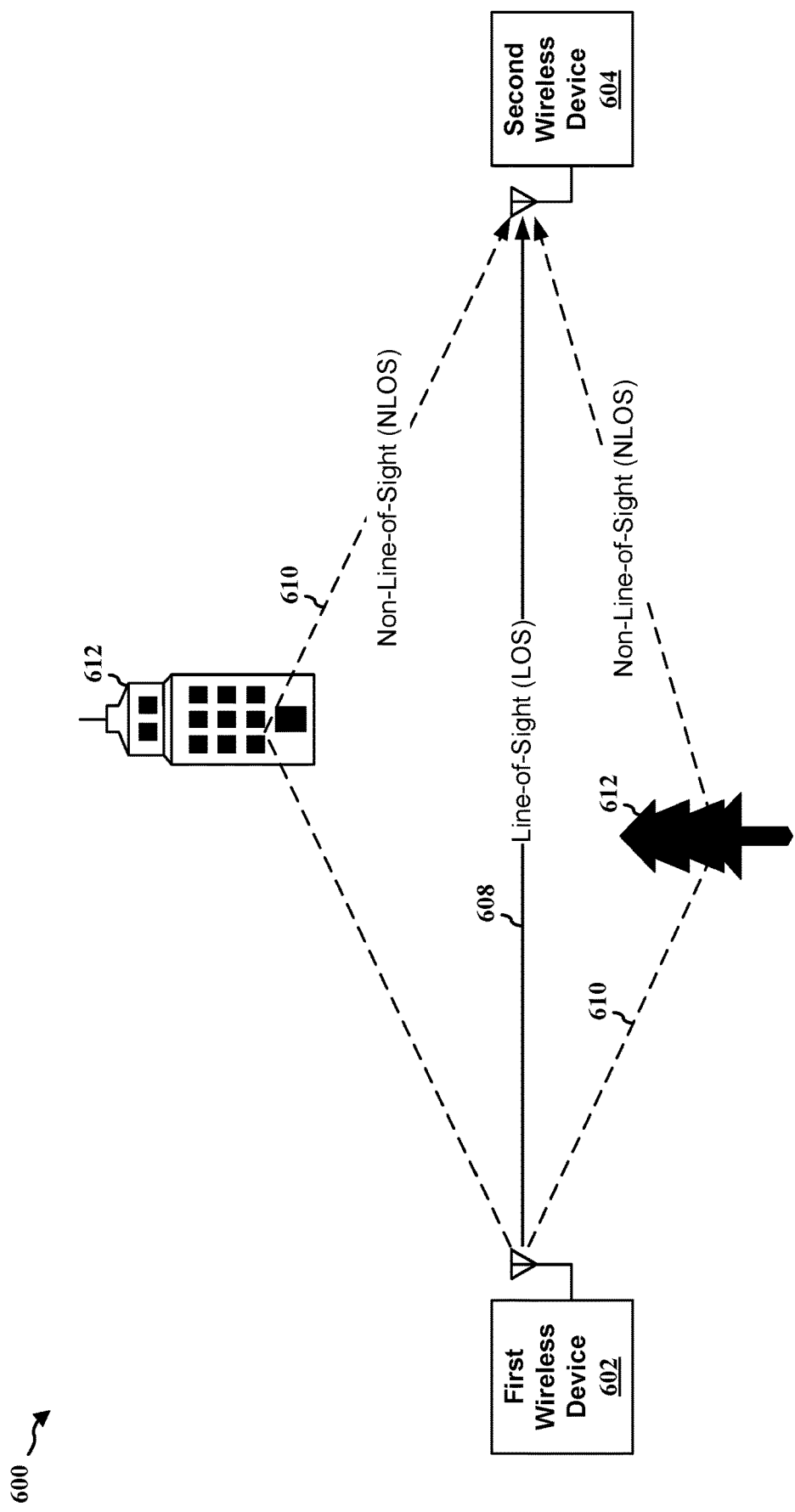
FIG. 6 is a diagram illustrating an example communication between wireless devices involving line-of-sight (LOS) and non-line-of-sight (NLOS) channels in accordance with various aspects of the present disclosure.

The accuracy of an SL-based ranging or positioning may be affected by whether UEs are in a line-of-sight (LOS)

condition or in a non-line-of-sight (NLOS) condition with each other. FIG. 6 is a diagram 600 illustrating an example communication between wireless devices involving LOS and NLOS channels in accordance with various aspects of the present disclosure. A first wireless device 602 (e.g., a UE, a positioning reference device, a sidelink device, a base station, etc.) may be configured or scheduled to transmit data to a second wireless device 604 (e.g., a UE, a positioning reference device, a sidelink device, a base station, etc.). In some scenarios, as shown at 608, the data transmitted from the first wireless device 602 may reach the second wireless device 604 directly without being obstructed by obstacle(s). In other scenarios, as shown at 610, the data transmitted from first wireless device 602 may reach the second wireless device 604 indirectly via reflection, refraction, and/or penetration, etc. (e.g., one or more objects 612 may obstruct or may be within the transmission path of the data). As a signal traveling through an NLOS path/channel such as shown at 610 may reach the second wireless device 604 later and/or with a weaker power compared to a signal traveling through an LOS path/channel such as shown at 608 (e.g., a path/channel without obstructions), the RTT for signals travelling via an NLOS path/channel may also be longer. As such, a calculation or an estimation of a distance between the first wireless device 602 and the second wireless device 604 based on the RTT may not be accurate.

For purposes of the present disclosure, a signal/data transmission without being obstructed by obstacle(s) may be referred to as a "LOS transmission," a "LOS signal/data," a "signal/data transmitted via an LOS path/channel," etc., whereas a signal/data transmission that is obstructed by obstacle(s) may be referred to as an "NLOS transmission," an "NLOS signal/data," a "signal/data transmitted via an NLOS path/channel," etc., (e.g., signal/data transmission involving reflection, refraction, and/or penetration, etc.). Signal reflection may be referring to a signal transmitted from a transmitter (e.g., the first wireless device 602) in a signal/beam path that is bounced off from one or more objects (e.g., the objects 612) before reaching a receiver (e.g., the second wireless device 604). Signal refraction may refer to a signal that is transmitted from a transmitter in a signal/beam path and changes its direction as it passes through an obstacle (e.g., a material or a medium in which the signal is able to pass/penetrate through) before reaching a receiver. Signal penetration may refer to a signal that is transmitted from a transmitter in a signal/beam path and penetrates an object or medium before reaching a receiver.

Figure 7:
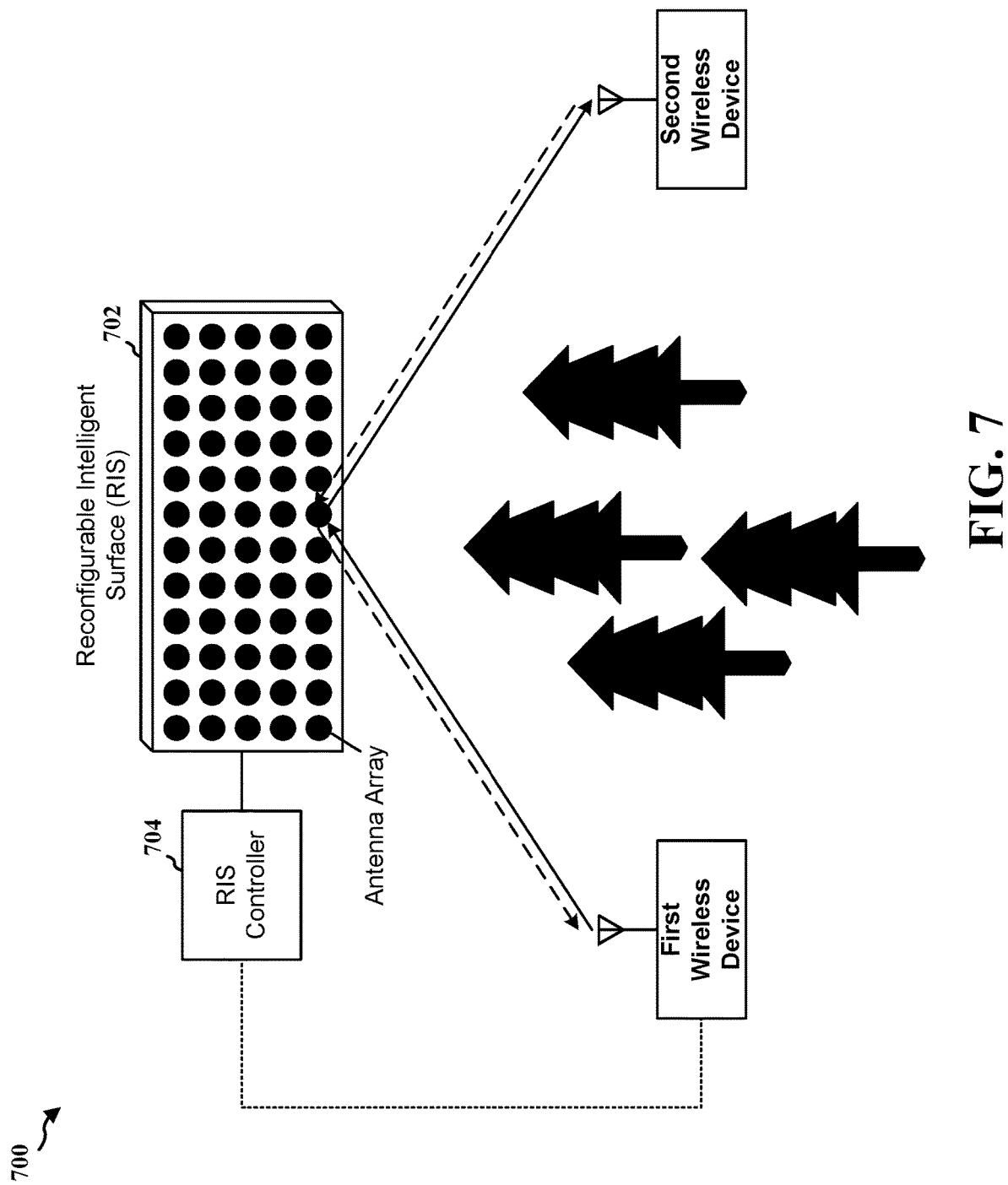
FIG. 7 is a diagram illustrating an example reconfigurable intelligent surface (RIS) in accordance with various aspects of the present disclosure.

To improve communication between wireless devices that are in an NLOS condition (or not in an LOS condition), a reconfigurable intelligent surface (RIS) (which may also be referred to as a "reflection intelligent surface") may be used by the wireless devices to assist their transmission/reception (or relaying) of signals. FIG. 7 is a diagram 700 illustrating an example reconfigurable intelligent surface in accordance with various aspects of the present disclosure. As shown at 702, an RIS may be a planar structure that is engineered/configured to have properties that enable a dynamic control of the electromagnetic waves. For example, an RIS may be a node that is capable of receiving a signal from a first wireless device (e.g., a transmitter) and then re-radiating or reflecting the signal to a second wireless device (e.g., a receiver) with controllable time-delays. An RIS may include a phased array without a transceiver, and an RIS may be designed based on an antenna or a metamaterial, where the RIS may be configured to reflect or re-radiate a signal to one or more directions. For example, a phase shifting control may be integrated with an antenna panel to control the phase shifting of the antenna panel. An RIS may include multiple small elements that are associated with different time-delays and thereby the RIS may be capable of synthesizing a scattering behavior of an arbitrarily-shaped object of the same size. This feature may, for instance, be used to beamform a signal towards a receiving wireless device.

In some examples, as shown at 704, an RIS may include an RIS controller and one or more antenna arrays, where the RIS controller may control the one or more antenna arrays to receive/reflect signal towards one or more directions. The RIS controller may be able to communicate with other nodes, e.g., a UE, a base station, an RSU, etc. For example, in a cellular network, a network node (e.g., a base station) may control an RIS, where the network node may determine/configure one or more parameters for the RIS, such as an activation/deactivation time, a phase, beam direction(s), and/or beamforming weights used by the RIS, etc. The base station may indicate the determined/configured parameters to one or more UEs, and a UE may use the RIS to assist its transmission and/or reception of signal with other UE(s) based at least in part on the determined/configured parameters. A communication link between the base station and the RIS may be wired or wireless. In some examples, an RIS may function as a UE (e.g., the RIS includes hardware components and/or functions of a UE). In other examples, an RIS may be co-located or associated with a UE, such that the RIS may communicate with a base station or another UE via the UE.

As an RIS may be capable of reflecting or re-radiating signals to a different direction, the RIS may be used by wireless devices to turn an NLOS path/channel to a path/channel that is close or similar to an LOS path/channel by reflecting/relaying signals transmitted between wireless devices. As such, wireless devices may use an MS to improve their communication when the wireless devices are not in an LOS condition (e.g., the wireless devices are in an NLOS condition), where one wireless device may transmit signals to another wireless device via the MS. The MS may also be used by wireless devices to improve network coverage/throughput, and to reduce power consumption. For example, an MS may be configured to reflect signals transmitted from a transmitting device toward a direction or an area that is not covered by the signals (e.g., a coverage hole, etc.) with less power compared to increasing the transmission power of the transmitting device.

Aspects presented herein may improve the efficiency and performance of an SL-based ranging or positioning. Aspects presented herein may improve the accuracy of an SL ranging that is based on calculating the RTT of transmitted/received PRSs. In one aspect of the represent disclosure, at least one RIS may be utilized by one or more wireless devices for relaying reference signals (e.g., SL PRSs) to improve the accuracy of an SL-based ranging or positioning. For example, as an NLOS path/channel may increase the RTT between PRSs transmitted to and/or PRSs received from a wireless device, or the NLOS path/channel may affect or block transmissions of the PRSs between wireless devices, an RIS may enable the PRSs to be transmitted and/or received by one or more wireless devices in a path/channel that is closer or similar to an LOS path/channel.

Figure 8:
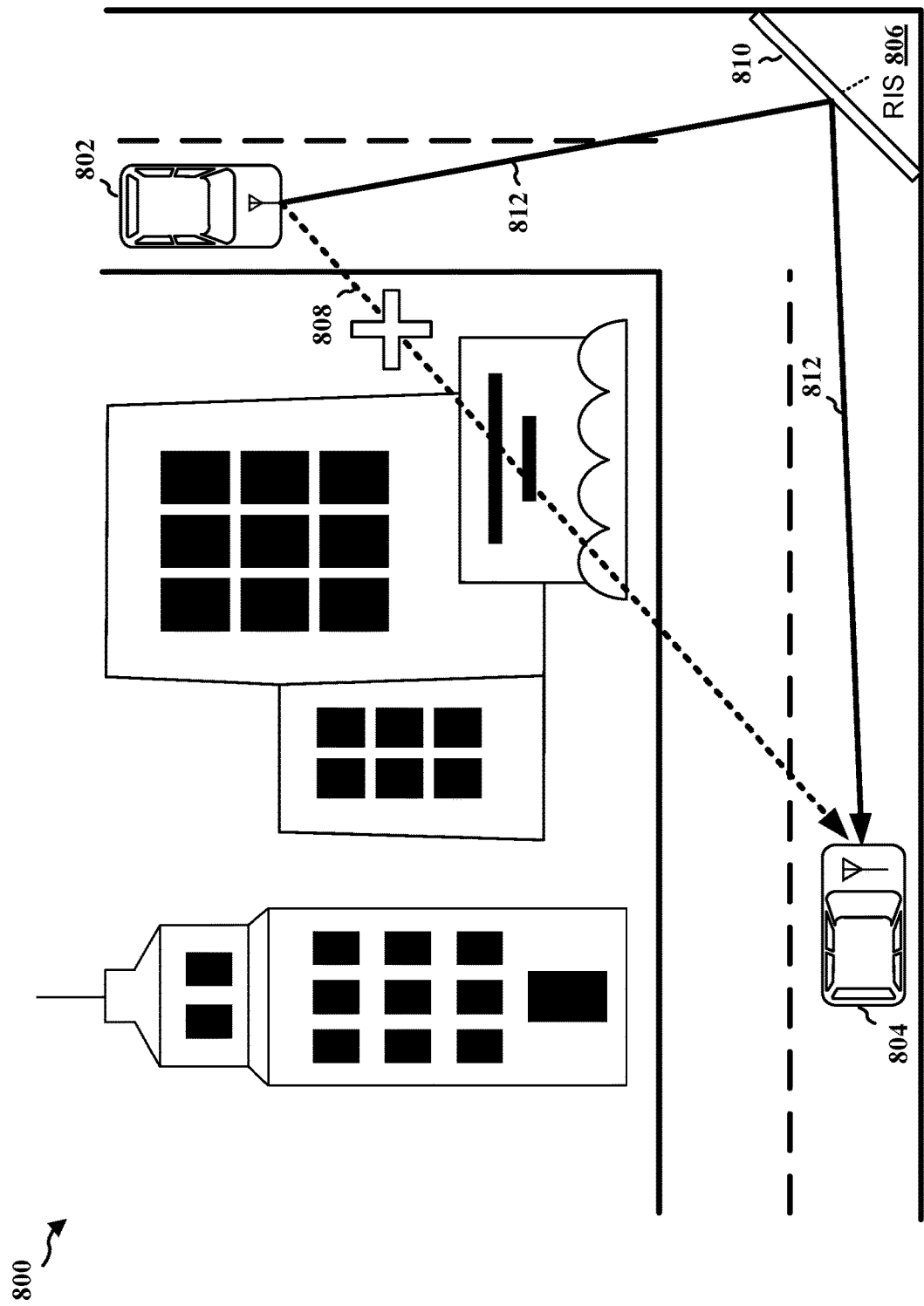
FIG. 8 is a diagram illustrating an example of deploying an RIS to assist sidelink communication between UEs in accordance with various aspects of the present disclosure.

FIG. 8 is a diagram 800 illustrating an example of deploying an RIS to assist sidelink communication between UEs in accordance with various aspects of the present disclosure. A first UE 802 may establish an SL-based ranging session with a second UE 804, where the first UE 802 and/or the second UE 804 may be performing an RTT based sidelink ranging (e.g., the first UE 802 and the second UE 804 may exchange PRSs and calculate RTT for transmitted and received PRSs), such as described in connection with FIG. 5. In some scenarios, as shown at 808, the channel between the first UE 802 and the second UE 804 may be an NLOS channel (e.g., the channel may be blocked by one or more obstacles, such as buildings). Thus, the PRSs may not be successfully exchanged between the first UE 802 and the second UE 804, e.g., the PRSs transmitted from one UE may reach another UE with delays or with degraded power, or the PRSs transmitted from one UE may not reach another UE, etc.

In one example, to improve or to facilitate the SL-ranging between the first UE 802 and the second UE 804, as shown at 810, at least one RIS 806 may be used by the UEs (e.g., may be deployed at an intersection of two roads) to reflect/relay PRSs transmitted by one UE to another UE. For example, as shown at 812, the MS 806 may enable PRSs transmitted by the first UE 802 to reflect/relay to the second UE 802, such that the first UE 802 and the second UE 804 may be communicating with each other based on a path/channel that is closer or similar to an LOS path/channel (e.g., a path/channel without obstacles). In other words, the RIS reflection may convert a channel from NLOS to a channel similar to LOS. While the converted channel (e.g., as shown at 812) may not be an exact LOS channel, the converted channel may provide better propagation compared to an NLOS channel (e.g., as shown at 808).

In one example, the RIS 806 may be co-located with an RSU, such that the RIS 806 may be a stationary RIS for SL. In another example, the RIS 806 may be deployed as an stand-alone device, where the RIS 806 may include sidelink/V2X transceiver and is capable of performing sidelink/V2X communication. In some examples, the RIS 806 (or the co-located RSU) may announce/broadcast its RIS configuration, presence, and/or availability via sidelink communication. For example, the RIS 806 or its associated RSU may send broadcast transmissions over sidelink (e.g., sidelink broadcast messages) to indicate the co-location with RIS. In addition, the RIS 806 or its associated RSU may also send broadcast transmissions to indicate resources (e.g., slots) that the RIS will be turned on (e.g., the RIS will be activated to reflect signals). Although the example in FIG. 8 is illustrated for a vehicle application, the concepts may similarly be applied for other UEs that are not associated with a vehicle.

Figure 9:
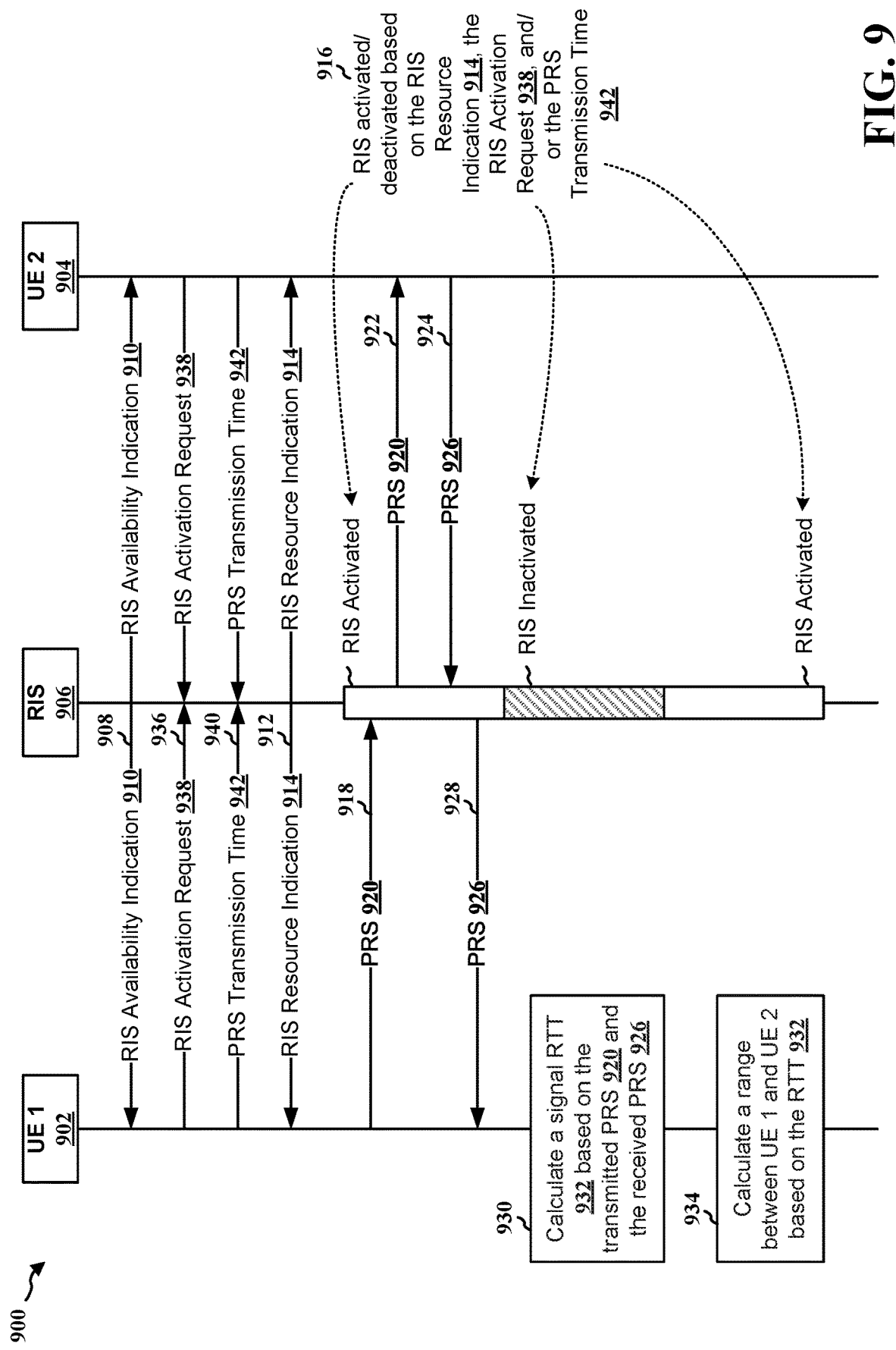
FIG. 9 is a communication flow illustrating an example of two UEs performing an SL ranging with an assistance of an RIS in accordance with various aspects of the present disclosure.

FIG. 9 is a communication flow 900 illustrating an example of two UEs performing an SL ranging with an assistance of an RIS in accordance with various aspects of the present disclosure. The numberings associated with the communication flow 900 do not specify a particular temporal order and are merely used as references for the communication flow 900.

A first UE 902 (e.g., the first UE 802) may establish or initiate an SL-based ranging session with a second UE 904 (e.g., the second UE 804), where the first UE 902 and/or the second UE 904 may perform an RTT based sidelink ranging (e.g., the first UE 902 and the second UE 904 may exchange PRSs and calculate RTT for transmitted and received PRSs), such as described in connection with FIGS. 5 and 8. An RIS 906 (e.g., the RIS 806) may be within a transmission range of the first UE 902 and/or the second UE 904, such that the RIS 906 may be able to receive one or more signals transmitted from the first UE 902 and/or the second UE 904, and the RIS 906 may be able to reflect or re-radiate the one or more signals to the first UE 902 and/or the second UE 904. In one example, the MS 906 may be associated with an RSU that is capable of sidelink/V2X communication, and the MS 906 may be co-located with the RSU. In such an example, the RSU may control the MS 906 (e.g., activate the MS, de-activate the MS, change parameters associated with the MS, etc.) via an MS controller. In another example, the MS 906 may be a stand-alone device with sidelink capability integrated (e.g., the RIS 906 is capable of sidelink/V2X communication, the RIS 906 is a UE, etc.).

At 908, the RIS 906 (or an associated RSU) may transmit/broadcast an RIS availability indication 910 to one or more UEs (e.g., UEs within its transmission range), which may include the first UE 902 and/or the second UE 904. The RIS availability indication 910 may indicate that the RIS 906 is RIS-capable (e.g., has the capability to provide RIS) or that the associated RSU is co-located with the RIS 906.

At 912, the RIS 906 may transmit/broadcast an RIS resource indication 914 to one or more UEs, which may include the first UE 902 and/or the second UE 904. The RIS resource indication 914 may indicate one or more resources (e.g., slots) in which the RIS 906 will be activated or turned on (e.g., the RIS 906 will be activated to reflect signal(s) in those resources). For example, the RIS resource indication 914 may indicate a time in which the RIS 906 will be activated (e.g., from 09:10:00 to 09:10:02, or at slots #1, 3, 5, 7 of a frame, etc.), a duration in which the RIS 906 will be activated (e.g., for ten slots after a triggering event or a specified time), and/or a periodicity in which the RIS 906 will be activated (e.g., every two or four slots, etc.). In some examples, the RIS availability indication 910 and the RIS resource indication 914 may be the same indication, e.g., the RIS resource indication 914 may implicitly indicate that the RIS 906 or an RSU associated with the RIS 906 is RIS-capable. In other examples, the RIS availability indication 910 and the RIS resource indication 914 may be separate indications. Then, as shown at 916, the RIS 906 may be activated or deactivated based on the RIS resource indication 914 (and/or based on an RIS activation request 938, or an indicated PRS transmission time 942 described below).

At 918, the first UE 902 may transmit one or more PRSs to the RIS 906 (or to the second UE 904 via the RIS 906) when the RIS 906 is activated, where the one or more PRSs may be reflected/re-radiated by the RIS 906 to the second UE 904. For example, in response to the RIS availability indication 910 and/or the RIS resource indication 914, the first UE 902 may transmit a PRS 920 during resources (e.g., slots) in which the RIS 906 is activated. At 922, after the PRS 920 reaches the RIS 906, the RIS 906 may reflect/re-radiate the PRS 920 to the second UE 904.

At 924, the second UE 904 may transmit one or more PRSs to the RIS 906 (or to the first UE 902 via the RIS 906) when the RIS 906 is activated, where the one or more PRSs may be reflected/re-radiated by the RIS 906 to the first UE 902. For example, in response to the received PRS 920, the RIS availability indication 910, and/or the RIS resource indication 914, the second UE 904 may transmit a PRS 926 during resources (e.g., slots) in which the RIS 906 is activated. At 928, after the PRS 926 reaches the RIS 906, the RIS 906 may reflect/re-radiate the PRS 926 to the first UE 902.

In some examples, the first UE 902 and/or the second UE 904 may be a UE (e.g., a vehicle UE) that is capable of performing a full duplex communication, where the first UE 902 and/or the second UE 904 may transmit and receive data at the same time (e.g., performing bi-directional network data transmissions at the same time). For example, the first UE 902 and/or the second UE 904 may have a large antenna panel or multiple transmit-receive points (TRP) equipped for the full-duplex communication. As such, the first UE 902 and/or the second UE 904 may transmit and receive signals at the same time.

At 930, the first UE 902 may calculate an RTT 932 for the transmitted PRS 920 and the received PRS 926. For example, the RTT 932 may be calculated from the time the first UE 902 starts to transmit the PRS 920 to the time the first UE 902 detects/receives the PRS 926 from the RIS 906, such as described in connection with 538 of FIG. 5.

At 934, the first UE 902 may calculate or estimate a range between the first UE 902 and the second UE 904 based on the RTT 932.

Figure 10B:
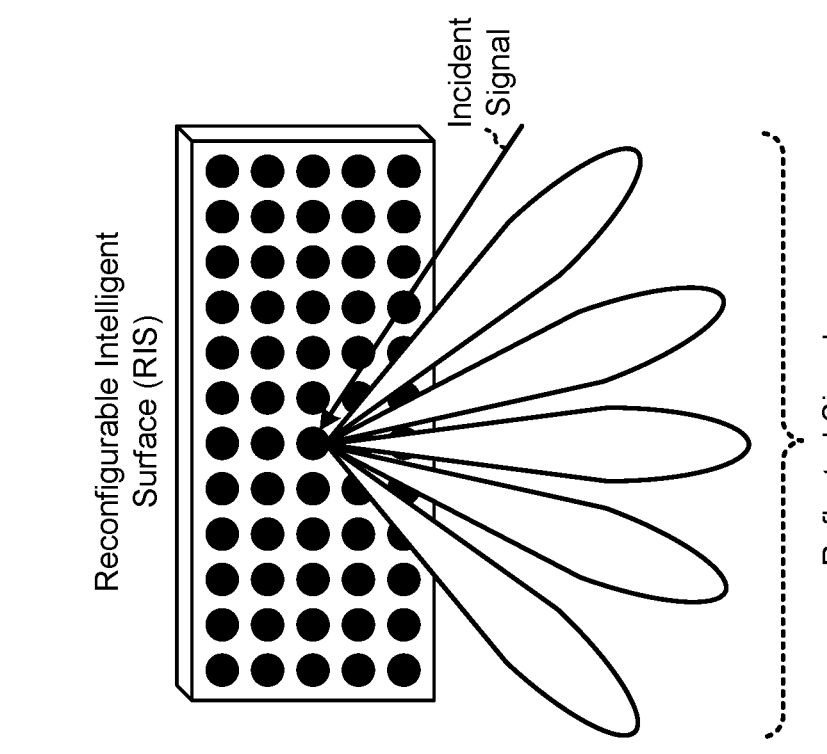
FIGS. 10A and 10B are diagrams illustrating examples of RIS reflected signals in accordance with various aspects of the present disclosure.
Figure 10A:
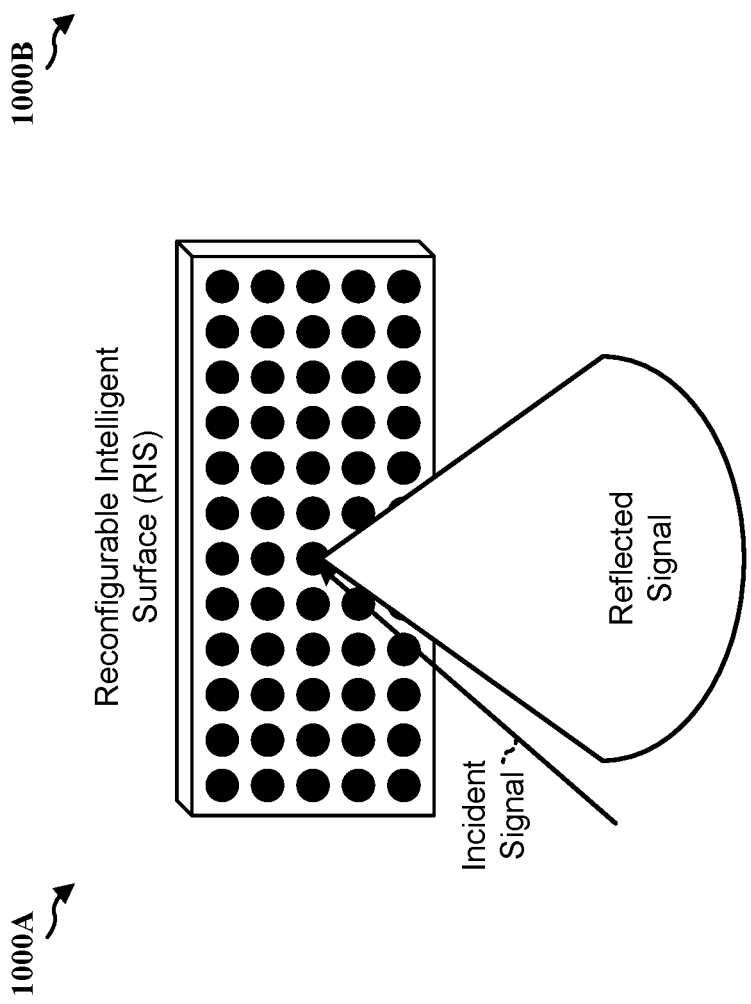

In one example, the RIS 906 may be configured to operate in a (semi-)static manner. For example, under the (semi-)static manner, the precoding weights (or beam direction(s)) for incident (e.g., received) and/or reflected signal(s) may remain the same across multiple reflection instances, where a reflection instance may refer to a time duration (e.g., one slot) for RIS operation (e.g., a duration in which the MS 906 is activated). In other words, there may be no dynamic change of precoding weights and/or beam direction(s) for incident and/or reflected signal(s) across multiple reflection instances. In one example, as shown by diagrams 1000A and 1000B of FIGS. 10A and 10B, the MS 906 may be configured to reflect the signal in a larger angle range (e.g., the signal reflected by the MS 906 covers a wide angle range). For example, as shown by the diagram 1000A, the reflected signal may be a wide beam (compared to the incident signal) that covers a wide angle range. Alternatively, as shown by the diagram 1000B, the reflected signal may include multiple concurrent narrower beams pointing to different directions. As such, the MS 906 may operate in the MS 906 in a (semi-)static manner as the precoding weights and/or beam direction for the MS 906 or for an MS operation may not be adjusted over a period time. In another example, the RIS 906 may not be associated with different precoding weights and/or beam direction(s), where the RIS 906 may be configured to reflect signal in a fixed angle and/or range when it is activated, and the RIS 906 does not reflect signal when it is inactivated (e.g., a simpler implementation without dynamic precoding weights adjustment).

Figure 11:
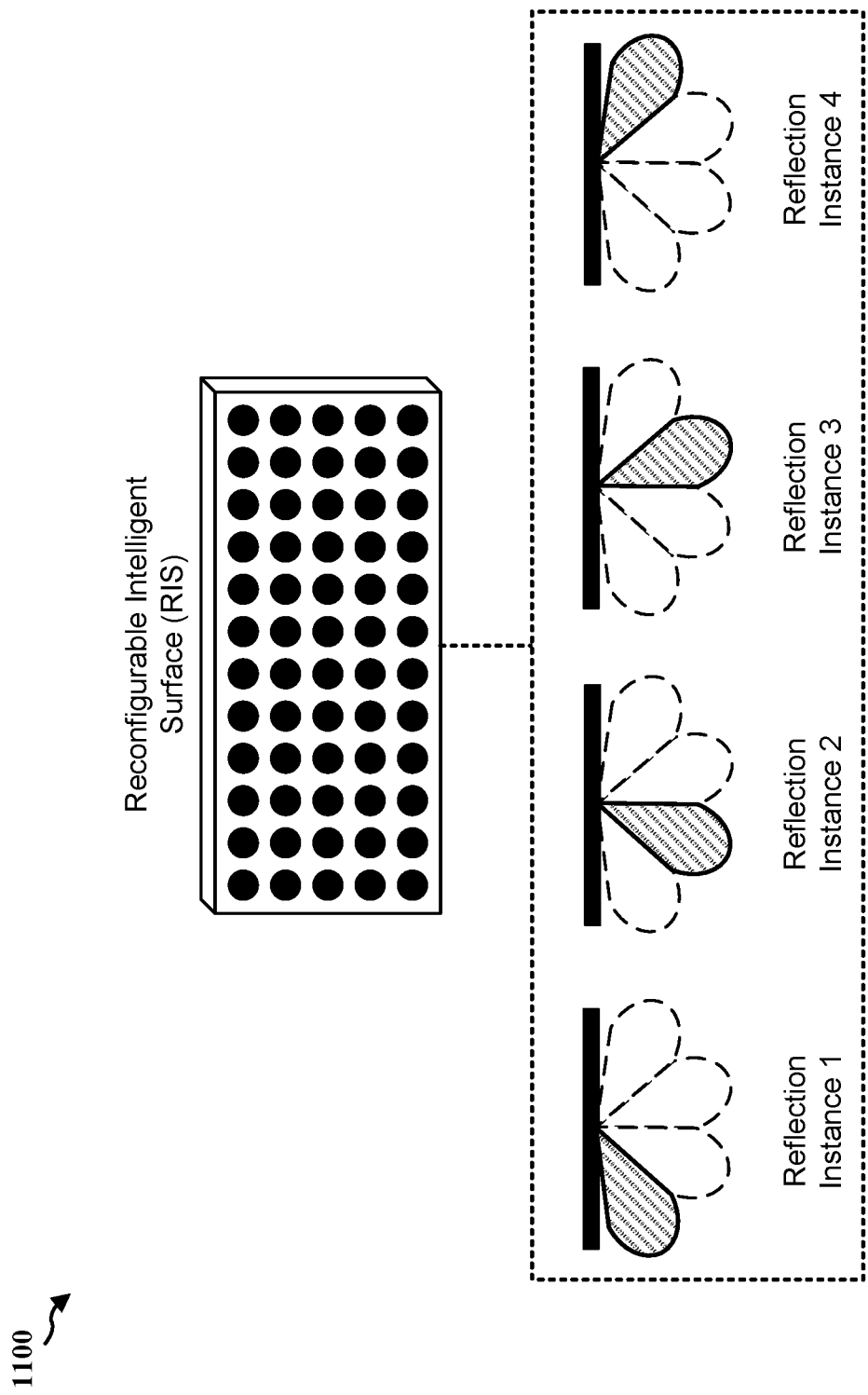
FIG. 11 is a diagram illustrating an example of an RIS configured to reflect signals dynamically in accordance with various aspects of the present disclosure.

In another example, the RIS 906 may be configured to operate in a dynamic manner. Under the dynamic manner, the incident beam direction (e.g., direction for receiving a signal/beam) and/or the reflected beam direction (e.g., direction for reflecting/re-radiating a signal/beam) may be adjusted (e.g., by the RIS 906 or an RSU associated with the RIS 906) dynamically. For example, as shown by a diagram 1100 of FIG. 11, in each reflection instance, the reflected signal may be configured to cover a smaller angle range that is different from a previous and/or a subsequent reflection instance. As such, different precoding weights (e.g., for phase shift) may be applied to the RIS 906 across multiple reflection instances. In other words, the precoding weights and/or the beam direction(s) may be varying across different reflection instances to dynamically adjust the beam direction for the incident and/or the reflected signal.

Referring back to FIG. 9, in some examples, at 908 and/or 912, the MS 906 may transmit the RIS availability indication 910 and/or the MS resource indication 914 via a sidelink broadcast message. In other words, the MS 906 may transmit a sidelink transmission in a broadcast manner, where the sidelink transmission may carry one or multiple of its MS capability/co-location, and/or time resources that RIS is activated.

In another aspect of the present disclosure, the RIS 906 may operate based on a request (e.g., the MS operation is on-demand). For example, referring back to FIG. 9, at 936, the first UE 902 or the second UE 904 may transmit/broadcast an RIS activation request 938 to one or more UEs/RSUs, which may include the MS 906. If the RIS 906 receives the MS activation request 938, the MS 906 may transmit/broadcast (via a sidelink message) at least one of the MS availability indication 910 and/or the MS resource indication 914 in response to the MS activation request 938. As such, at least some of the indications associated with the MS 906 may be transmitted from the RIS 906 upon request. For example, the MS 906 may transmit (e.g., unicast) or broadcast the MS availability indication 910 (e.g., the MS capability or co-location), and the MS availability indication 910 may be received by the first UE 902. In response, if the first UE 902 is configured to perform a ranging with the second UE 904, the first UE 902 may send the MS activation request 938 (e.g., an RIS-assisted ranging request) to the RIS 906. Then, in response to the RIS activation request 938, the RIS 906 may indicate (e.g., via the RIS resource indication 914) and/or reserve resources for PRS transmission from the first UE 902 (e.g., during which the RIS 906 is activated). Then, as shown at 916, the RIS 906 may be activated based on the RIS activation request 938.

In another example, the first UE 902 and/or the second UE 904 may determine that tis ranging operation may be improved with the assistance of an RIS (e.g., the RIS 906). For example, based on the processing of the PRS transmission(s) (e.g., the PRS 926) from the second UE 904, the first UE 902 may be able to determine whether there is an LOS path between the two UEs (e.g., based on analysis of variation of phase and/or power of the channel impulse responses as described in connection with FIG. 6). If the first UE 902 determines that there is no LOS between the two UEs, the first UE 902 may transmit/broadcast the RIS activation request 938 to one or more UEs/RSUs including the RIS 906.

In another example, the first UE 902 and/or the second UE 904 may request for assistance/help from the RIS 906 if there is a RIS nearby, where the UEs may assume that an RIS assisted ranging may improve the ranging performance. For example, the RIS 906 may be configured to announce its presence/capability periodically, such that the first UE 902 and/or the second UE 904 may be aware of that the RIS 906 is near-by to provide communication assistance (e.g., to help the ranging).

In another example, the first UE 902 and/or the second UE 904 may determine time resource(s) in which its PRS transmission (e.g., the transmission of the PRS 920 and/or PRS 926) will take place, and the first UE 902 and/or the second UE 904 may indicate the determined time resource (s) to the RIS 906, such as via the RIS activation request 938 or an PRS transmission time 942 message/indication. In response, as shown at 916, the RIS 906 may be activated based on the time resource(s) indicated by the first UE 902 and/or the second UE 904. For example, if the first UE 902 indicates to the RIS 906 that the PRS 920 is to be transmitted at a third slot of a frame, the RIS 906 may activate the RIS 906 at the third slot of the frame.

In one aspect of the present disclosure, a UE performing a ranging with a target UE on sidelink may perform the ranging at least twice if the UE is aware of the existence of an MS (e.g., the MS 906), where at least one of the ranging operations may be performed based on PRS transmission during which the MS is activated, and at least one of the ranging operations may be performed based on PRS transmission during which the RIS is not activated. Then, an RTT between the UE and another UE (e.g., a target UE) may be determined/calculated for each ranging operation. After the UE performs the ranging operation multiple times (e.g., at least two times), the UE may obtain multiple RTT measurements.

In some examples, the UE may be configured to calculate or estimate the distance between the UE and the target UE based on an RTT measurement that has the smaller/lowest value among the multiple RTT measurements. In some scenarios, the distance that is calculated based on a smaller/lowest RTT measurement (or value) may be more likely to be an accurate distance. For example, if two UEs have a direct LOS path, the RTT measurement with and without RIS being activated may be the same or similar, so the smaller/lowest RTT may correspond to an absolute distance between the two UEs. In another example, if there is no LOS path between the two UEs, the smaller RTT value may correspond to either an NLOS path distance between the two UEs, or a road distance between the two UEs (e.g., as shown by the FIG. 8). Thus, by selecting the smaller/lowest RTT value from the multiple RTT measurements for distance determination, the calculated/determined distance between the two UEs based on the SL ranging will not be larger than the road distance between the two UEs. In other words, the distance between the two UEs determined based on the smaller/lowest RTT value may be a range value between an absolute distance and a road distance, where such kind of certainty may significantly improve confidence of utilizing the sidelink ranging results in V2X application.

Figure 12:
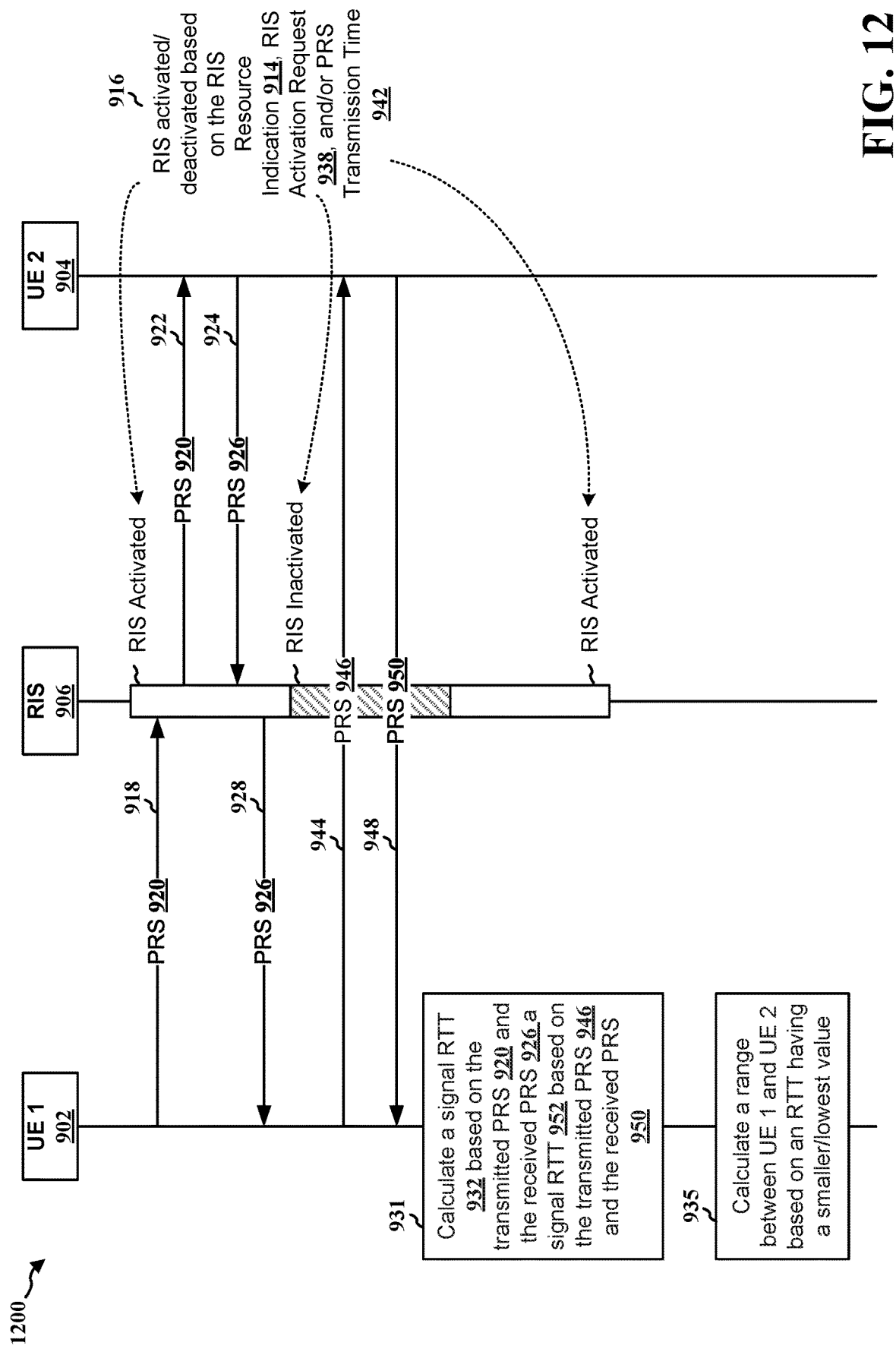
FIG. 12 is a communication flow illustrating an example of a UE performing a ranging with a target UE on sidelink at least twice in accordance with various aspects of the present disclosure.

FIG. 12 is a communication flow 1200 illustrating an example of a UE (e.g., the UE 902) performing a ranging with a target UE (e.g., the UE 904) on sidelink at least twice in accordance with various aspects of the present disclosure.

At 918, the first UE 902 may transmit the PRS 920 to the RIS 906 (or to the second UE 904 via the RIS 906) when the RIS 906 is activated. At 922, after the PRS 920 reaches the RIS 906, the RIS 906 may reflect/re-radiate the PRS 920 to the second UE 904.

At 924, in response to the received PRS 920, the second UE 904 may transmit the PRS 926 to the MS 906 (or to the first UE 902 via the RIS 906) during resources (e.g., slots) in which the MS 906 is activated. At 928, after the PRS 926 reaches the RIS 906, the MS 906 may reflect/re-radiate the PRS 926 to the first UE 902.

At 944, the first UE 902 may transmit a PRS 946 to the second UE 904 when the RIS 906 is not activated (e.g., the MS 906 is not reflecting signals). At 948, if the second UE 904 receives the PRS 946, the second UE 904 may transmit a PRS 950 to the first UE 902 in response. The second UE 904 may transmit the PRS 950 during resources (e.g., slots) in which the RIS 906 is activated or not activated.

At 931, the first UE 902 may calculate a first RTT 932 for the transmitted PRS 920 and the received PRS 926 and a second RTT 952 for the transmitted PRS 946 and the received PRS 950, such as described in connection with 538 of FIG. 5.

At 935, the first UE 902 may calculate or estimate a range between the first UE 902 and the second UE 904 based on the first RTT 932 or the second RTT 952, whichever having a smaller/lowest value.

Figure 13:
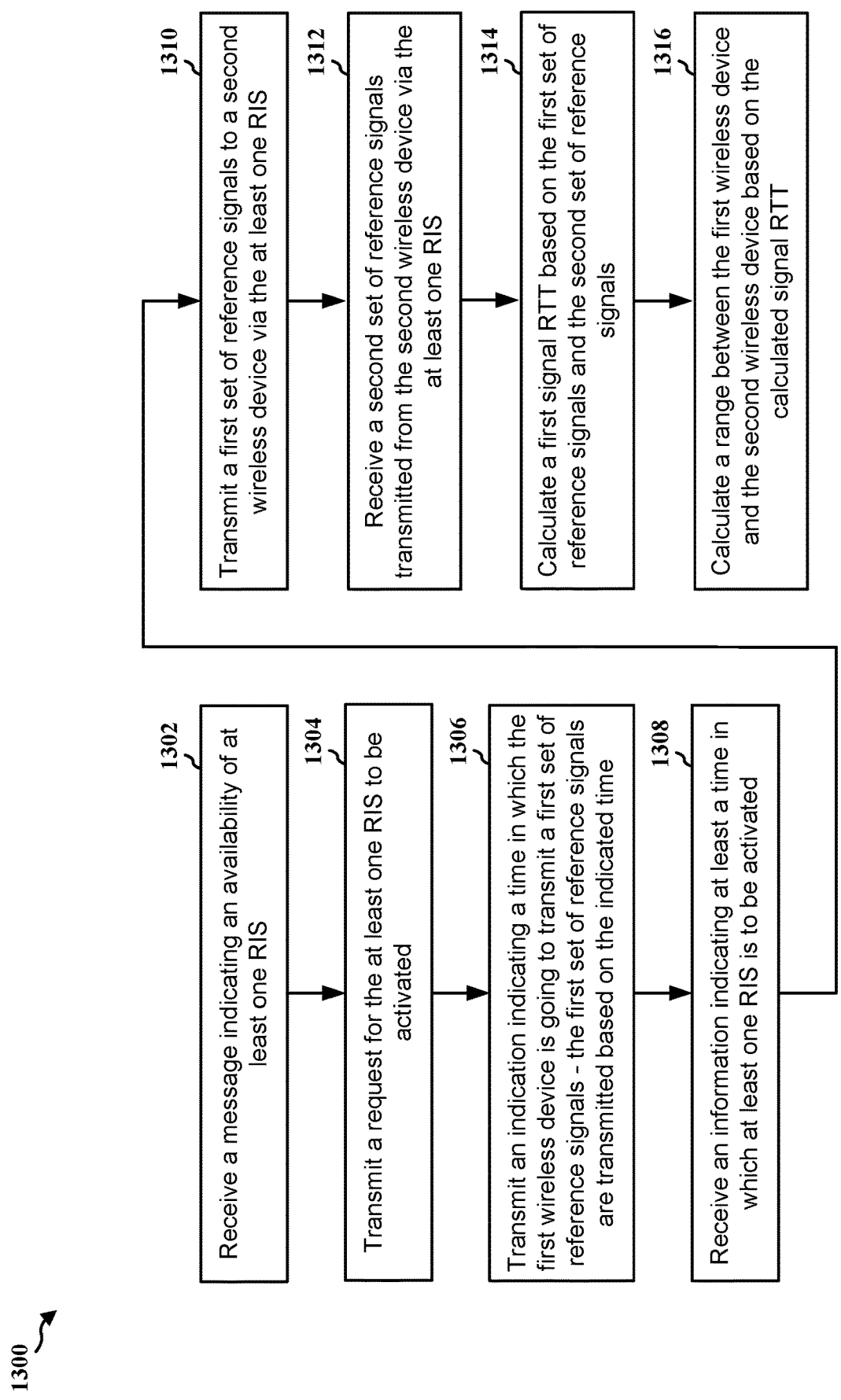
FIG. 13 is a flowchart of a method of wireless communication in accordance with aspects presented herein.

FIG. 13 is a flowchart 1300 of a method of wireless communication. The method may be performed by a wireless device or a component of a wireless device (e.g., the UE 104; the device 350; the first wireless device 602; the first UE 802, 902; the apparatus 1502; a processing system, which may include the memory 360 and which may be the entire device 350 or a component of the device 350, such as the TX processor 368, the RX processor 356, and/or the controller/processor 359). The method may enable the wireless device to perform an SL ranging with an assistance of an MS.

At 1302, a first wireless device may receive a message indicating an availability of at least one RIS, such as described in connection with FIG. 9. For example, at 908, the first UE 902 may receive an RIS availability indication 910 from the MS 906, where the MS availability indication 910 may indicate that the RIS 906 is associated with at last one MS. The reception of the message indicating an availability of at least one MS may be performed by, e.g., the MS detection component 1540 and/or the reception component 1530 of the apparatus 1502 in FIG. 15.

At 1304, the first wireless device may transmit a request for the at least one RIS to be activated, such as described in connection with FIG. 9. For example, at 936, the first UE 902 may transmit an MS activation request 938 to the MS 906. The transmission of the request may be performed by, e.g., the MS request component 1542 and/or the transmission component 1534 of the apparatus 1502 in FIG. 15.

At 1306, the first wireless device may transmit an indication indicating a first time in at which the first wireless device is going to transmit the first set of reference signals, and where the first set of reference signals are transmitted based on the indicated time, such as described in connection with FIG. 9. For example, at 940, the first UE 902 may transmit a PRS transmission time 942 to the MS 906, where the PRS transmission time 942 may indicate a time in which the first UE 902 is going to transmit the PRS 920. The transmission of the indication indicating a first time in at which the first wireless device is going to transmit the first set of reference signals may be performed by, e.g., the PRS transmission time indication component 1544 and/or the transmission component 1534 of the apparatus 1502 in FIG. 15.

At 1308, the first wireless device may receive an information indicating at least a time in which at least one RIS is to be activated, such as described in connection with FIG. 9. For example, at 912, the first UE 902 may receive an RIS resource indication 914 from the MS 906, where the MS resource indication 914 may indicate a time in which the MS 906 is to be activated. The reception of the information indicating at least a time in which at least one RIS is to be activated may be performed by, e.g., the MS activation time process component 1546 and/or the reception component 1530 of the apparatus 1502 in FIG. 15. The information may be received via a sidelink broadcast message.

In one example, the at least one MS may be associated with an RSU, and the information and the message may be received from the RSU.

In another example, the information may be received based on the request. In such an example, the request may be transmitted based at least in part on the first wireless device and the second wireless device being NLOS.

At 1310, the first wireless device may transmit a first set of reference signals to a second wireless device via the at least one MS, such as described in connection with FIG. 9. For example, at 918, the first UE 902 may transmit the PRS 920 to the MS 906 (or to the second UE 904 via the MS 906). The transmission of the first set of reference signals may be performed by, e.g., the PRS configuration component 1548 and/or the transmission component 1534 of the apparatus 1502 in FIG. 15.

At 1312, the first wireless device may receive a second set of reference signals transmitted from the second wireless device via the at least one MS, such as described in connection with FIG. 9. For example, at 928, the first UE 902 may receive the PRS 926 from the RIS 906 (or from the second UE 904 via the MS 906). The reception of the second set of reference signals may be performed by, e.g., the PRS process component 1550 and/or the reception component 1530 of the apparatus 1502 in FIG. 15. The first set of reference signals and the second set of reference signals may be SL PRSs.

At 1314, the first wireless device may calculate a first signal RTT based on the first set of reference signals and the second set of reference signals, such as described in connection with FIG. 9. For example, at 930, the first UE 902 may calculate a signal RTT 932 based on the transmitted PRS 920 and the received PRS 926. The calculation of the signal RTT may be performed by, e.g., the RTT calculation component 1552 of the apparatus 1502 in FIG. 15.

In one example, the first signal RTT may be calculated based on a first time at which the first wireless device transmits the first set of reference signals and a second time at which the first wireless device receives the second set of reference signals.

At 1316, the first wireless device may calculate a range between the first wireless device and the second wireless device based on the calculated signal RTT, such as described in connection with FIG. 9. For example, at 934, the first UE 902 may calculate a range between the first UE 902 and second UE 904 based on the RTT 932. The calculation of the range may be performed by, e.g., the range calculation component 1554 of the apparatus 1502 in FIG. 15.

In another example, the first wireless device may transmit a third set of reference signals to a second wireless device when the at least one RIS is not activated, receive a fourth set of reference signals transmitted from the second wireless device, and calculate a second signal RTT based on the third set of reference signals and the fourth set of reference signals, such as described in connection with FIG. 12. In such an example, the first wireless device may calculate a range between the first wireless device and the second wireless device based on the first signal RTT or the second signal RTT whichever has a smaller RTT value.

Figure 14:
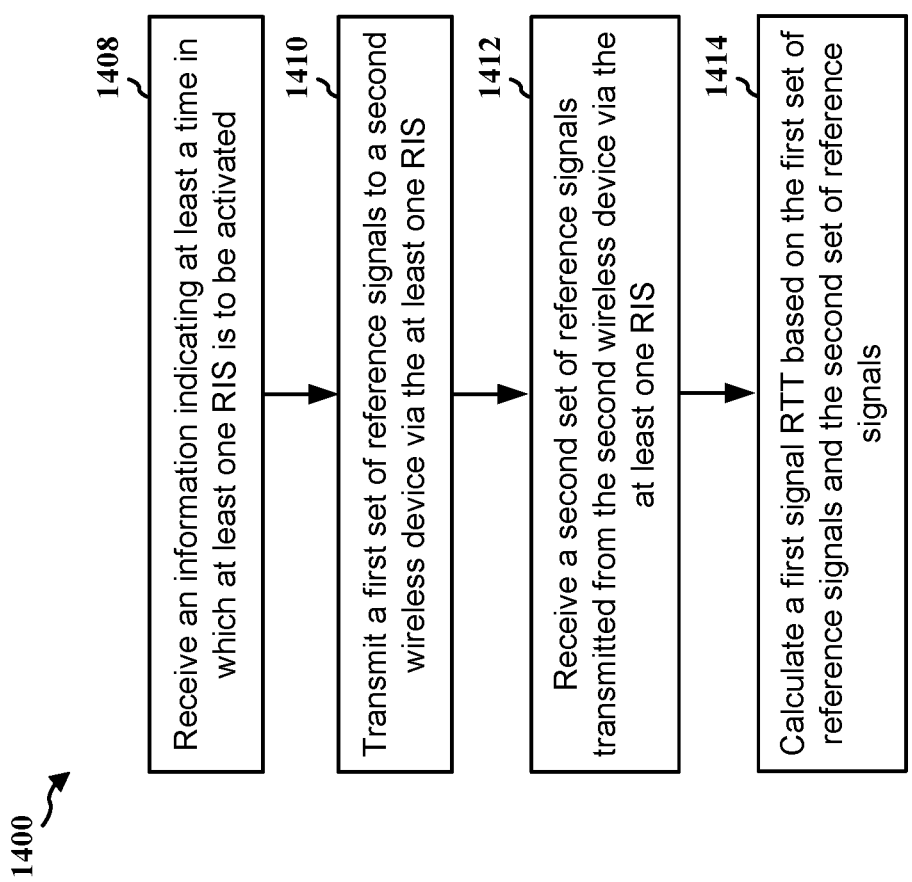
FIG. 14 is a flowchart of a method of wireless communication in accordance with aspects presented herein.

FIG. 14 is a flowchart 1400 of a method of wireless communication. The method may be performed by a wireless device or a component of a wireless device (e.g., the UE 104; the first wireless device 602, 350; the first UE 802, 902; the apparatus 1502; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the wireless device to perform an SL ranging with an assistance of an MS.

At 1408, a first wireless device may receive an information indicating at least a time in which at least one MS is to be activated, such as described in connection with FIG. 9. For example, at 912, the first UE 902 may receive an MS resource indication 914 from the MS 906, where the MS resource indication 914 may indicate a time in which the MS 906 is to be activated. The reception of the information indicating at least a time in which at least one RIS is to be activated may be performed by, e.g., the RIS activation time process component 1546 and/or the reception component 1530 of the apparatus 1502 in FIG. 15. The information may be received via a sidelink broadcast message.

In one example, the at least one MS may be associated with an RSU, and the information and the message may be received from the RSU.

In another example, the information may be received based on the request. In such an example, the request may be transmitted based at least in part on the first wireless device and the second wireless device being NLOS.

At 1410, the first wireless device may transmit a first set of reference signals to a second wireless device via the at least one MS, such as described in connection with FIG. 9. For example, at 918, the first UE 902 may transmit the PRS 920 to the MS 906 (or to the second UE 904 via the MS 906). The transmission of the first set of reference signals may be performed by, e.g., the PRS configuration component 1548 and/or the transmission component 1534 of the apparatus 1502 in FIG. 15.

At 1412, the first wireless device may receive a second set of reference signals transmitted from the second wireless device via the at least one MS, such as described in connection with FIG. 9. For example, at 928, the first UE 902 may receive the PRS 926 from the MS 906 (or from the second UE 904 via the MS 906). The reception of the second set of reference signals may be performed by, e.g., the PRS process component 1550 and/or the reception component 1530 of the apparatus 1502 in FIG. 15. The first set of reference signals and the second set of reference signals may be SL PRSs.

At 1414, the first wireless device may calculate a first signal RTT based on the first set of reference signals and the second set of reference signals, such as described in connection with FIG. 9. For example, at 930, the first UE 902 may calculate a signal RTT 932 based on the transmitted PRS 920 and the received PRS 926. The calculation of the signal RTT may be performed by, e.g., the RTT calculation component 1552 of the apparatus 1502 in FIG. 15.

In one example, the first signal RTT may be calculated based on a first time at which the first wireless device transmits the first set of reference signals and a second time at which the first wireless device receives the second set of reference signals.

In another, the first wireless device may receive a message indicating an availability of at least one MS, such as described in connection with FIG. 9. For example, at 908, the first UE 902 may receive an RIS availability indication 910 from the MS 906, where the MS availability indication 910 may indicate that the RIS 906 is associated with at last one RIS. The reception of the message indicating an availability of at least one MS may be performed by, e.g., the RIS detection component 1540 and/or the reception component 1530 of the apparatus 1502 in FIG. 15.

In another example, the first wireless device may transmit a request for the at least one RIS to be activated, such as described in connection with FIG. 9. For example, at 936, the first UE 902 may transmit an MS activation request 938 to the RIS 906. The transmission of the request may be performed by, e.g., the RIS request component 1542 and/or the transmission component 1534 of the apparatus 1502 in FIG. 15.

In another example, the first wireless device may transmit an indication indicating a first time in at which the first wireless device is going to transmit the first set of reference signals, and where the first set of reference signals are transmitted based on the indicated time, such as described in connection with FIG. 9. For example, at 940, the first UE 902 may transmit a PRS transmission time 942 to the MS 906, where the PRS transmission time 942 may indicate a time in which the first UE 902 is going to transmit the PRS 920. The transmission of the indication indicating a first time in at which the first wireless device is going to transmit the first set of reference signals may be performed by, e.g., the PRS transmission time indication component 1544 and/or the transmission component 1534 of the apparatus 1502 in FIG. 15.

In another example, the first wireless device may calculate a range between the first wireless device and the second wireless device based on the calculated signal RTT, such as described in connection with FIG. 9. For example, at 934, the first UE 902 may calculate a range between the first UE 902 and second UE 904 based on the RTT 932. The calculation of the range may be performed by, e.g., the range calculation component 1554 of the apparatus 1502 in FIG. 15.

In another example, the first wireless device may transmit a third set of reference signals to a second wireless device when the at least one MS is not activated, receive a fourth set of reference signals transmitted from the second wireless device, and calculate a second signal RTT based on the third set of reference signals and the fourth set of reference signals, such as described in connection with FIG. 12. In such an example, the first wireless device may calculate a range between the first wireless device and the second wireless device based on the first signal RTT or the second signal RTT whichever has a smaller RTT value.

Figure 15:
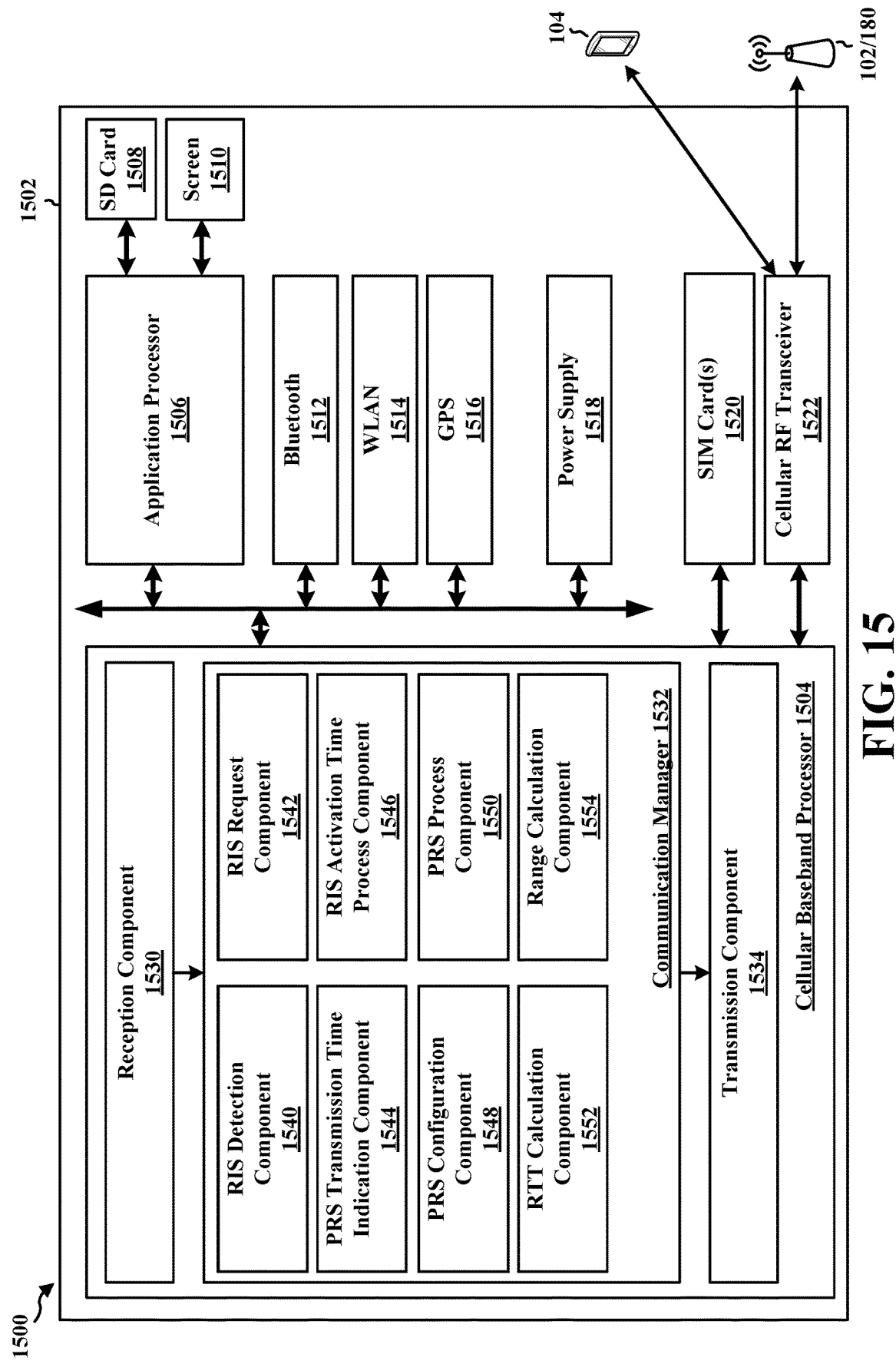
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a baseband processor 1504 (also referred to as a modem) coupled to a RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE (e.g., of the device 350) and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an RIS detection component 1540 that is configured to receive a message indicating an availability of the at least one RIS, e.g., as described in connection with 1302 of FIG. 13. The communication manager 1532 further includes an MS request component 1542 that is configured to transmit a request for the at least one MS to be activated, e.g., as described in connection with 1304 of FIG. 13. The communication manager 1532 further includes a PRS transmission time indication component 1544 that is configured to transmit an indication indicating a first time in at which the first wireless device is going to transmit the first set of reference signals, and where the first set of reference signals are transmitted based on the indicated time, e.g., as described in connection with 1306 of FIG. 13. The communication manager 1532 further includes an RIS activation time process component 1546 that is configured to receive an information indicating at least a time in which at least one RIS is to be activated, e.g., as described in connection with 1308 of FIGS. 13 and/or 1408 of FIG. 14. The communication manager 1532 further includes a PRS configuration component 1548 that is configured to transmit a first set of reference signals to a second wireless device via the at least one RIS, e.g., as described in connection with 1310 of FIGS. 13 and/or 1410 of FIG. 14. The communication manager 1532 further includes a PRS process component 1550 that is configured to receive a second set of reference signals transmitted from the second wireless device via the at least one RIS, e.g., as described in connection with 1312 of FIGS. 13 and/or 1412 of FIG. 14. The communication manager 1532 further includes an RTT calculation component 1552 that is configured to calculate a first signal RTT based on the first set of reference signals and the second set of reference signals, e.g., as described in connection with 1314 of FIGS. 13 and/or 1414 of FIG. 14. The communication manager 1532 further includes a range calculation component 1554 that is configured to calculate a range between the first wireless device and the second wireless device based on the calculated first signal RTT, e.g., as described in connection with 1316 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for receiving a message indicating an availability of the at least one RIS (e.g., the MS detection component 1540 and/or the reception component 1530). The apparatus 1502 includes means for transmitting a request for the at least one RIS to be activated (e.g., the RIS request component 1542 and/or the transmission component 1534). The apparatus 1502 includes means for transmitting an indication indicating a first time in at which the first wireless device is going to transmit the first set of reference signals, and where the first set of reference signals are transmitted based on the indicated time (e.g., the PRS transmission time indication component 1544 and/or the transmission component 1534). The apparatus 1502 includes means for receiving an information indicating at least a time in which at least one RIS is to be activated (e.g., the RIS activation time process component 1546 and/or the reception component 1530). The apparatus 1502 includes means for transmitting a first set of reference signals to a second wireless device via the at least one RIS (e.g., the PRS configuration component 1548 and/or the transmission component 1534). The apparatus 1502 includes means for receiving a second set of reference signals transmitted from the second wireless device via the at least one RIS (e.g., the PRS process component 1550 and/or the reception component 1530). The apparatus 1502 includes means for calculating a first signal RTT based on the first set of reference signals and the second set of reference signals (e.g., the RTT calculation component 1552). The apparatus 1502 includes means for calculating a range between the first wireless device and the second wireless device based on the calculated first signal RTT (e.g., the range calculation component 1554).

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
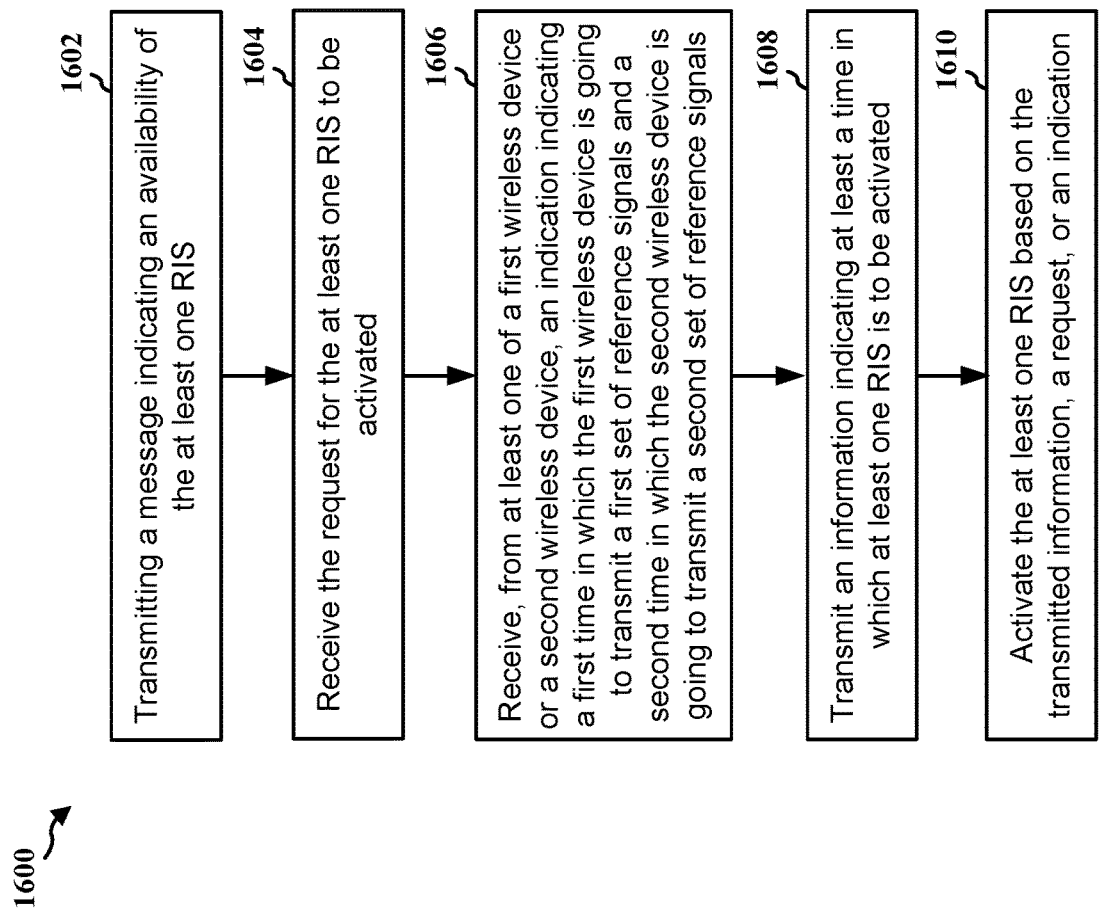
FIG. 16 is a flowchart of a method of wireless communication in accordance with aspects presented herein.

FIG. 16 is a flowchart 1600 of a method of wireless communication. The method may be performed by an apparatus or a component of an apparatus (e.g., the UE 104; the device 350; the RIS 806, 906; the apparatus 1802; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the apparatus to assist UEs performing a sidelink ranging or a sidelink communication.

At 1602, an apparatus (which may be an RIS or an RSU associated with an RIS) may transmit a message indicating an availability of the at least one RIS, such as described in connection with FIG. 9. For example, at 908, the RIS 906 may transmit an RIS availability indication 910 to the first UE 902, where the RIS availability indication 910 may indicate that the MS 906 is associated with at last one MS or is RIS-capable. The transmission of the message indicating an availability of the at least one MS may be performed by, e.g., the MS availability indication component 1840 and/or the transmission component 1834 of the apparatus 1802 in FIG. 18.

At 1604, the apparatus may receive the request for the at least one RIS to be activated, such as described in connection with FIG. 9. For example, at 936, the MS 906 may receive an MS activation request 938 from the first UE 802. The reception of the request may be performed by, e.g., the MS request process component 1842 and/or the reception component 1830 of the apparatus 1802 in FIG. 18. In one example, the information transmitted at 1608 may be based on the request.

At 1606, the apparatus may receive, from at least one of a first wireless device or a second wireless device, an indication indicating a first time in which the first wireless device is going to transmit a first set of reference signals and a second time in which the second wireless device is going to transmit a second set of reference signals, such as described in connection with FIG. 9. For example, at 940, the MS 906 may receive a PRS transmission time 942 from the first UE 902 and/or the second UE 904, where the PRS transmission time 942 may indicate a time in which the first UE 902 and/or the second UE 904 is going to transmit PRS. The reception of the indication may be performed by, e.g., the PRS transmission time process component 1844 and/or the reception component 1830 of the apparatus 1802 in FIG. 18. In one example, the apparatus may activate the at least one MS at the first time and the second time. In another example, the apparatus may deactivate the at least one MS outside the indicated time.

At 1608, the apparatus may transmit an information indicating at least a time in which at least one MS is to be activated, such as described in connection with FIG. 9. For example, at 912, the MS 906 may transmit an MS resource indication to the first UE 902 and/or the second UE 904. The transmission of the information indicating at least a time in which at least one MS is to be activated may be performed by, e.g., the MS activation indication component 1846 and/or the transmission component 1834 of the apparatus 1802 in FIG. 18. The information may be transmitted via a sidelink broadcast message.

At 1610, the apparatus may activate the at least one RIS based on the transmitted information, a request, or an indication, such as described in connection with FIG. 9. For example, at 916 the MS 906 may be activated or deactivated based on the MS resource indication 914, the MS activation request 938, and/or the PRS transmission time 942. The activation of the at least one RIS may be performed by, e.g., the MS control component 1848 of the apparatus 1802 in FIG. 18.

Figure 17:
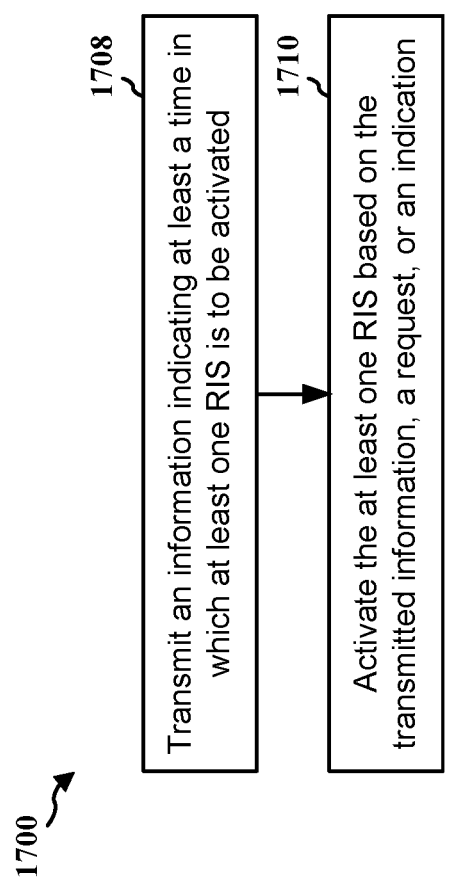
FIG. 17 is a flowchart of a method of wireless communication in accordance with aspects presented herein.

FIG. 17 is a flowchart 1700 of a method of wireless communication. The method may be performed by an apparatus or a component of an apparatus (e.g., the UE 104; the device 350; the MS 806, 906; the apparatus 1802; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the apparatus to assist UEs performing a sidelink ranging or a sidelink communication.

At 1708, an apparatus (which may be an MS or an RSU associated with an MS) may transmit an information indicating at least a time in which at least one MS is to be activated, such as described in connection with FIG. 9. For example, at 912, the MS 906 may transmit an MS resource indication to the first UE 902 and/or the second UE 904. The transmission of the information indicating at least a time in which at least one MS is to be activated may be performed by, e.g., the MS activation indication component 1846 and/or the transmission component 1834 of the apparatus 1802 in FIG. 18. The information may be transmitted via a sidelink broadcast message.

At 1710, the apparatus may activate the at least one MS based on the transmitted information, a request, or an indication, such as described in connection with FIG. 9. For example, at 917 the MS 906 may be activated or deactivated based on the MS resource indication 914, the MS activation request 938, and/or the PRS transmission time 942. The activation of the at least one RIS may be performed by, e.g., the MS control component 1848 of the apparatus 1802 in FIG. 18.

In one example, the apparatus may transmit a message indicating an availability of the at least one MS, such as described in connection with FIG. 9. For example, at 908, the RIS 906 may transmit an RIS availability indication 910 to the first UE 902, where the MS availability indication 910 may indicate that the RIS 906 is associated with at last one RIS or is RIS-capable. The transmission of the message indicating an availability of the at least one RIS may be performed by, e.g., the RIS availability indication component 1840 and/or the transmission component 1834 of the apparatus 1802 in FIG. 18.

In another example, the apparatus may receive the request for the at least one MS to be activated, such as described in connection with FIG. 9. For example, at 936, the MS 906 may receive an RIS activation request 938 from the first UE 802. The reception of the request may be performed by, e.g., the MS request process component 1842 and/or the reception component 1830 of the apparatus 1802 in FIG. 18. In such an example, the information transmitted at 1708 may be based on the request.

In another example, the apparatus may receive, from at least one of a first wireless device or a second wireless device, an indication indicating a first time in which the first wireless device is going to transmit a first set of reference signals and a second time in which the second wireless device is going to transmit a second set of reference signals, such as described in connection with FIG. 9. For example, at 940, the RIS 906 may receive a PRS transmission time 942 from the first UE 902 and/or the second UE 904, where the PRS transmission time 942 may indicate a time in which the first UE 902 and/or the second UE 904 is going to transmit PRS. The reception of the indication may be performed by, e.g., the PRS transmission time process component 1844 and/or the reception component 1830 of the apparatus 1802 in FIG. 18. In such an example, the apparatus may activate the at least one MS at the first time and the second time. In such an example, the apparatus may deactivate the at least one MS outside the indicated time.

Figure 18:
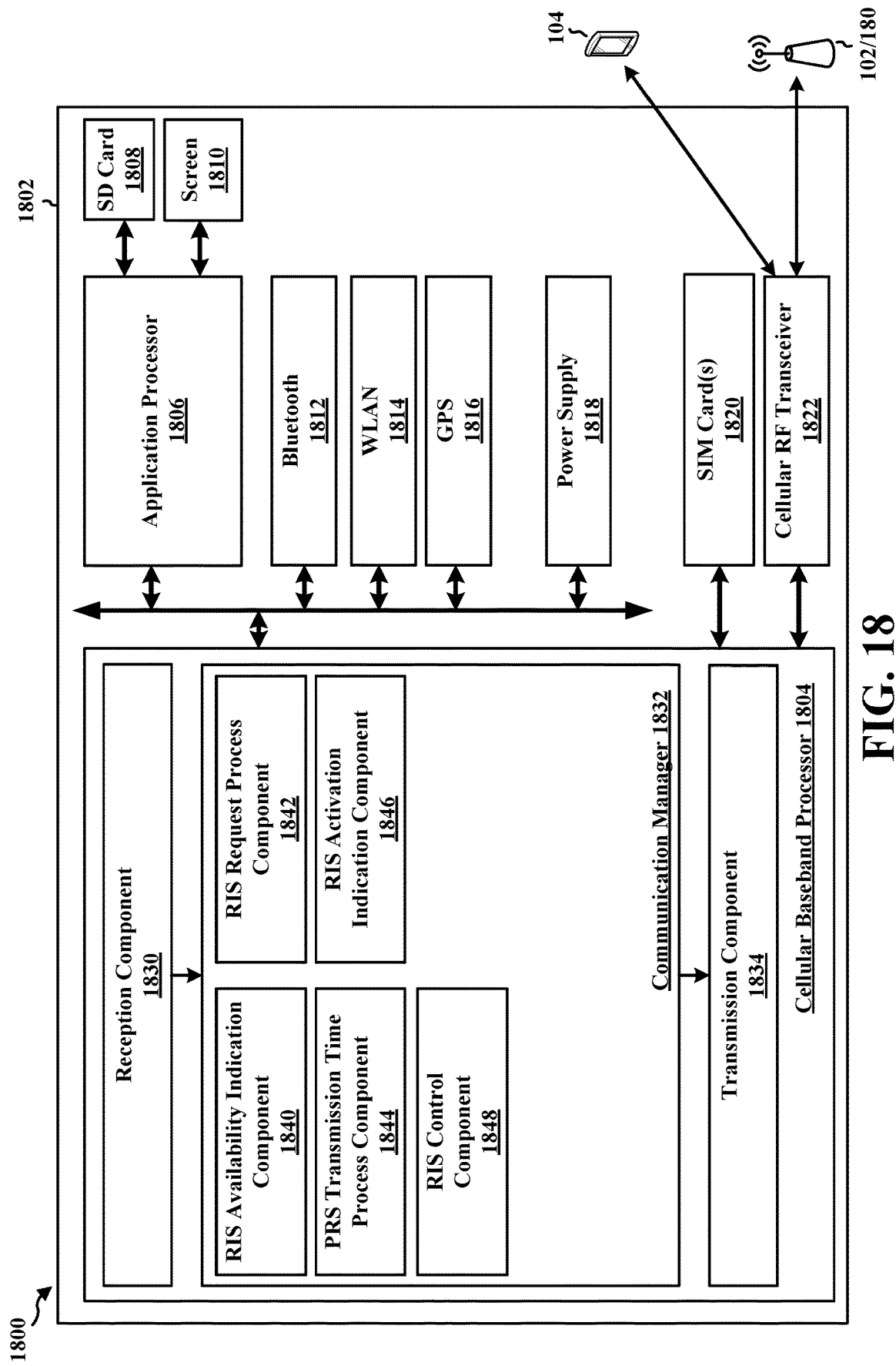
FIG. 18 is a diagram illustrating an example of a hardware implementation for an example apparatus in accordance with aspects presented herein.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a baseband processor 1804 (also referred to as a modem) coupled to a RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The baseband processor 1804 communicates through the RF transceiver 1822 with the UE 104 and/or BS 102/180. The baseband processor 1804 may include a computer-readable medium/memory. The computer-readable medium/memory may be non-transitory. The baseband processor 1804 is responsible for general processing, including the execution of software stored on the computer-readable medium/memory. The software, when executed by the baseband processor 1804, causes the baseband processor 1804 to perform the various functions described supra. The computer-readable medium/memory may also be used for storing data that is manipulated by the baseband processor 1804 when executing software. The baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband processor 1804. The baseband processor 1804 may be a component of the UE (e.g., a component of the device 350) and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes an RIS availability indication component 1840 that is configured to transmit a message indicating an availability of the at least one MS, e.g., as described in connection with 1602 of FIG. 16. The communication manager 1832 further includes an RIS request process component 1842 that is configured to receive the request for the at least one MS to be activated, e.g., as described in connection with 1604 of FIG. 16. The communication manager 1832 further includes a PRS transmission time process component 1844 that is configured to receive, from at least one of a first wireless device or a second wireless device, an indication indicating a first time in which the first wireless device is going to transmit a first set of reference signals and a second time in which the second wireless device is going to transmit a second set of reference signals, e.g., as described in connection with 1606 of FIG. 16. The communication manager 1832 further includes an MS activation indication component 1846 that is configured to transmit an information indicating at least a time in which at least one MS is to be activated, e.g., as described in connection with 1608 of FIG. 16 and/or 1708 of FIG. 17. The communication manager 1832 further includes an MS control component 1848 that is configured to activate the at least one RIS based on the transmitted information, a request, or an indication, e.g., as described in connection with 1610 of FIG. 16 and/or 1710 of FIG. 17.

The apparatus may include additional components that perform each of the blocks of the algorithm in the flowcharts of FIGS. 16 and 17. As such, each block in the flowcharts of FIGS. 16 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband processor 1804, includes means for transmitting a message indicating an availability of the at least one RIS (e.g., the MS availability indication component 1840 and/or the transmission component 1834). The apparatus 1802 includes means for receiving the request for the at least one MS to be activated (e.g., the MS request process component 1842 and/or the reception component 1830). The apparatus 1802 includes means for receiving, from at least one of a first wireless device or a second wireless device, an indication indicating a first time in which the first wireless device is going to transmit a first set of reference signals and a second time in which the second wireless device is going to transmit a second set of reference signals (e.g., the PRS transmission time process component 1844 and/or the reception component 1830). The apparatus 1802 includes means for transmitting an information indicating at least a time in which at least one MS is to be activated (e.g., the MS activation indication component 1846 and/or the transmission component 1834). The apparatus 1802 includes means for activating the at least one MS based on the transmitted information, a request, or an indication (e.g., the MS control component 1848).

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is for a method of wireless communication at a first wireless device, comprising: receiving an information indicating at least a time in which at least one RIS is to be activated; transmitting a first set of reference signals to a second wireless device via the at least one RIS; receiving a second set of reference signals transmitted from the second wireless device via the at least one RIS; and calculating a first signal RTT based on the first set of reference signals and the second set of reference signals.

In aspect 2, the method of aspect 1 further comprises: receiving a message indicating an availability of the at least one RIS.

In aspect 3, the method of any of aspects 1 and 2 further includes that the at least one RIS is associated with an RSU, and where the information and the message are received from the RSU.

In aspect 4, the method of any of aspects 1 to 3 further includes that the information is received via a sidelink broadcast message.

In aspect 5, the method of any of aspects 1 to 4 further includes that the first set of reference signals and the second set of reference signals are SL PRSs.

In aspect 6, the method of any of aspects 1 to 5 further includes that the signal RTT is calculated based on a first time at which the first wireless device transmits the first set of reference signals and a second time at which the first wireless device receives the second set of reference signals.

In aspect 7, the method of any of aspects 1 to 6 further comprises: calculating a range between the first wireless device and the second wireless device based on the calculated first signal RTT.

In aspect 8, the method of any of aspects 1 to 7 further includes that the first set of reference signals is transmitted to the second wireless device when the at least one RIS is activated, the method further comprises: transmitting a third set of reference signals to a second wireless device when the at least one RIS is not activated; receiving a fourth set of reference signals transmitted from the second wireless device; and calculating a second signal RTT based on the third set of reference signals and the fourth set of reference signals.

In aspect 9, the method of any of aspects 1 to 8 further comprises: calculating a range between the first wireless device and the second wireless device based on the first signal RTT or the second signal RTT whichever has a smaller RTT value.

In aspect 10, the method of any of aspects 1 to 9 further comprises: transmitting a request for the at least one RIS to be activated.

In aspect 11, the method of any of aspects 1 to 10 further includes that the information is received based on the request.

In aspect 12, the method of any of aspects 1 to 11 further includes that the request is transmitted based at least in part on the first wireless device and the second wireless device being NLOS.

In aspect 13, the method of any of aspects 1 to 12 further comprises: transmitting an indication indicating a first time in at which the first wireless device is going to transmit the first set of reference signals, and where the first set of reference signals are transmitted based on the indicated time.

Aspect 14 is an apparatus for wireless communication including at least one processor coupled to a memory and configured to implement any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is a method of wireless communication, comprising transmitting an information indicating at least a time in which at least one RIS is to be activated; and activating the at least one RIS based on the transmitted information, a request, or an indication.

In aspect 18, the method of aspect 17 further comprises: transmitting a message indicating an availability of the at least one MS.

In aspect 19, the method of any of aspects 17 and 18 further includes that the at least one MS is associated with an RSU.

In aspect 20, the method of any of aspects 17 to 19 further includes that the information is transmitted via a sidelink broadcast message.

In aspect 21, the method of any of aspects 17 to 20 further comprises: receiving the request for the at least one RIS to be activated.

In aspect 22, the method of any of aspects 17 to 21 further includes that the information is transmitted based on the request.

In aspect 23, the method of any of aspects 17 to 22 further comprises: receiving, from at least one of a first wireless device and a second wireless device, the indication, and where the indication indicates a first time in which the first wireless device is going to transmit a first set of reference signals and a second time in which the second wireless device is going to transmit a second set of reference signals.

In aspect 24, the method of any of aspects 17 to 23 further comprises: activating the at least one RIS at the first time and the second time.

In aspect 25, the method of any of aspects 17 to 24 further comprises: deactivating the at least one RIS outside the indicated time.

Aspect 26 is an apparatus for wireless communication including at least one processor coupled to a memory and configured to implement any of aspects 17 to 25.

Aspect 27 is an apparatus for wireless communication including means for implementing any of aspects 17 to 25.

Aspect 28 is a computer-readable medium storing computer executable code, where the code when executed by a processor causes the processor to implement any of aspects 17 to 25.

What is claimed is:

1. An apparatus for wireless communication at a first user equipment (UE), comprising:
    a memory; and
    at least one processor coupled to the memory and configured to:
        receive information indicating at least a time in which at least one reconfigurable intelligent surface (RIS) is to be activated, wherein the at least one RIS is deactivated outside of the indicated time;
        transmit a first set of reference signals to a second UE via the at least one RIS while the at least one RIS is activated based on the information;
        receive a second set of reference signals from the second UE via the at least one RIS while the at least one RIS is activated based on the information;
        transmit a third set of reference signals to the second UE via the at least one RIS while the at least one RIS is deactivated based on the information;
        receive a fourth set of reference signals from the second UE via the at least one RIS while the at least one RIS is deactivated based on the information;
        calculate a first signal round-trip time (RTT) based on the first set of reference signals and the second set of reference signals and a second signal RTT based on the third set of reference signals and the fourth set of reference signals; and
        determine a range between the first UE and the second UE based on the first signal RTT or the second signal RTT whichever has a smaller RTT value.

2. The apparatus of claim 1, wherein the at least one processor is further configured to:
    receive a message indicating an availability of the at least one RIS.

3. The apparatus of claim 2, wherein the at least one RIS is associated with a roadside unit (RSU), and wherein the information and the message are received from the RSU.

4. The apparatus of claim 1, wherein the information is received via a sidelink broadcast message.

5. The apparatus of claim 1, wherein the first set of reference signals, the second set of reference signals, the third set of reference signals, and the fourth set of reference signals are sidelink (SL) positioning reference signals (PRSs).

6. The apparatus of claim 1, wherein the first signal RTT is calculated based on a first time at which the first UE transmits the first set of reference signals and a second time at which the first UE receives the second set of reference signals.

7. The apparatus of claim 6, wherein the second signal RTT is calculated based on a third time at which the first UE transmits the third set of reference signals and a fourth time at which the first UE receives the fourth set of reference signals.

8. The apparatus of claim 1, wherein the at least one processor is further configured to:
    transmit a request for the at least one RIS to be activated.

9. The apparatus of claim 8, wherein the information is received based on the request.

10. The apparatus of claim 8, wherein the request is transmitted based at least in part on the first UE and the second UE being non-line-of-sight (NLOS).

11. The apparatus of claim 1, wherein the at least one processor is further configured to:
    transmit an indication indicating a first time at which the first UE is going to transmit the first set of reference signals, and wherein the first set of reference signals are transmitted based on the indicated time.

12. The apparatus of claim 1, further comprising a transceiver coupled to the at least one processor.

13. A method for wireless communication at a first user equipment (UE), comprising:
    receiving an information indicating at least a time in which at least one reconfigurable intelligent surface (RIS) is to be activated, wherein the at least one RIS is deactivated outside of the indicated time;
    transmitting a first set of reference signals to a second UE via the at least one RIS while the at least one RIS is activated based on the information;
    receiving a second set of reference signals from the second UE via the at least one RIS while the at least one RIS is activated based on the information;
    transmitting a third set of reference signals to the second UE via the at least one RIS while the at least one RIS is deactivated based on the information;
    receiving a fourth set of reference signals from the second UE via the at least one RIS while the at least one RIS is deactivated based on the information;
    calculating a first signal round-trip time (RTT) based on the first set of reference signals and the second set of reference signals and a second signal RTT based on the third set of reference signals and the fourth set of reference signals; and determine a range between the first UE and the second UE based on the first signal RTT or the second signal RTT whichever has a smaller RTT value.

14. The method of claim 13, further comprising:
receiving a message indicating an availability of the at least one RIS.

15. The method of claim 13, wherein the information is received via a sidelink broadcast message.

16. The method of claim 13, wherein the first set of reference signals, the second set of reference signals, the third set of reference signals, and the fourth set of reference signals are sidelink (SL) positioning reference signals (PRSs).

17. The method of claim 13, wherein the first signal RTT is calculated based on a first time at which the first UE transmits the first set of reference signals and a second time at which the first UE receives the second set of reference signals.

18. The method of claim 17, wherein the second signal RTT is calculated based on a third time at which the first UE transmits the third set of reference signals and a fourth time at which the first UE receives the fourth set of reference signals.

19. The method of claim 13, further comprising:
transmit a request for the at least one RIS to be activated.

20. The method of claim 19, wherein the information is received based on the request.

21. The method of claim 19, wherein the request is transmitted based at least in part on the first UE and the second UE being non-line-of-sight (NLOS).

22. The method of claim 13, further comprising:
transmitting an indication indicating a first time at which the first UE is going to transmit the first set of reference signals, and wherein the first set of reference signals are transmitted based on the indicated time.

23. An apparatus for wireless communication at a first user equipment (UE), comprising:
means for receiving an information indicating at least a time in which at least one reconfigurable intelligent surface (RIS) is to be activated, wherein the at least one RIS is deactivated outside of the indicated time;
means for transmitting a first set of reference signals to a second UE via the at least one RIS while the at least one RIS is activated based on the information;
means for receiving a second set of reference signals from the second UE via the at least one RIS while the at least one RIS is activated based on the information;
means for transmitting a third set of reference signals to the second UE via the at least one RIS while the at least one RIS is deactivated based on the information;
means for receiving a fourth set of reference signals from the second UE via the at least one RIS while the at least one RIS is deactivated based on the information;
means for calculating a first signal round-trip time (RTT) based on the first set of reference signals and the second set of reference signals and a second signal RTT based on the third set of reference signals and the fourth set of reference signals; and
means for determine a range between the first UE and the second UE based on the first signal RTT or the second signal RTT whichever has a smaller RTT value.

24. A non-transitory computer-readable medium storing computer executable code at a first user equipment (UE), the code when executed by at least one processor causes the at least one processor to:
receive information indicating at least a time in which at least one reconfigurable intelligent surface (RIS) is to be activated, wherein the at least one RIS is deactivated outside of the indicated time;
transmit a first set of reference signals to a second UE via the at least one RIS while the at least one RIS is activated based on the information;
receive a second set of reference signals from the second UE via the at least one RIS while the at least one RIS is activated based on the information;
transmit a third set of reference signals to the second UE via the at least one RIS while the at least one RIS is deactivated based on the information;
receive a fourth set of reference signals from the second UE via the at least one RIS while the at least one RIS is deactivated based on the information;
calculate a first signal round-trip time (RTT) based on the first set of reference signals and the second set of reference signals and a second signal RTT based on the third set of reference signals and the fourth set of reference signals; and
determine a range between the first UE and the second UE based on the first signal RTT or the second signal RTT whichever has a smaller RTT value.

* * * * *